(12) United States Patent
Sheppard et al.

(10) Patent No.: US 11,825,141 B2
(45) Date of Patent: Nov. 21, 2023

(54) METHODS AND APPARATUS TO ESTIMATE POPULATION REACH FROM DIFFERENT MARGINAL RATING UNIONS

(71) Applicant: The Nielsen Company (US), LLC, New York, NY (US)

(72) Inventors: Michael Sheppard, Holland, MI (US); Ludo Daemen, Duffel (BE); Jonathan Sullivan, Hurricane, UT (US); Michael D. Morgan, Bartlett, IL (US); Edward Murphy, North Stonington, CT (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/972,476

(22) Filed: Oct. 24, 2022

(65) Prior Publication Data

US 2023/0111617 A1    Apr. 13, 2023

Related U.S. Application Data

(63) Continuation of application No. 17/093,460, filed on Nov. 9, 2020, now Pat. No. 11,483,606, which is a
(Continued)

(51) Int. Cl.
*H04N 21/25* (2011.01)
*H04N 21/258* (2011.01)
(Continued)

(52) U.S. Cl.
CPC ..... *H04N 21/25883* (2013.01); *H04N 21/258* (2013.01); *H04N 21/44204* (2013.01)

(58) Field of Classification Search
None
See application file for complete search history.

(56) References Cited

U.S. PATENT DOCUMENTS

| 5,956,692 A | 9/1999 | Foley |
| 6,029,045 A | 2/2000 | Picco et al. |

(Continued)

FOREIGN PATENT DOCUMENTS

| JP | 2015529870 | 10/2015 |
| KR | 20160087263 | 7/2016 |

(Continued)

OTHER PUBLICATIONS

Huckett et al., "Combining Methods to Create Synthetic Microdata: Quantile Regression, Hot Deck, and Rank Swaping," Research Gate, Apr. 2008, 11 pages.
(Continued)

*Primary Examiner* — Hsiungfei Peng

(57) ABSTRACT

Example methods, apparatus, systems, and articles of manufacture are disclosed to estimate population reach for different unions based on marginal ratings. An example method includes performing first parallel computations to determine first multipliers corresponding to a total number of panelists exposed to media at (a) a first margin of time, (b) a second margin of time, and (c) a union corresponding to the first and second margins of time, keeping a subset of the first multipliers corresponding to unknown census data; performing second parallel computation to determine second multipliers corresponding to a total audience exposed to the media at the first margin of time and the second margin of time, the second parallel computations to be performed by solving second equations corresponding to a tree association; and determining an estimate for a population reach of the union based on the second multipliers.

27 Claims, 8 Drawing Sheets

Related U.S. Application Data continuation of application No. 16/355,393, filed on Mar. 15, 2019, now Pat. No. 10,856,027.

(51) Int. Cl.
  *H04N 21/442*  (2011.01)
  *H04N 21/658*  (2011.01)

(56) References Cited

U.S. PATENT DOCUMENTS

| | | | |
|---|---|---|---|
| 6,108,637 A | 8/2000 | Blumenau | |
| 6,460,025 B1 | 10/2002 | Fohn et al. | |
| 6,775,663 B1 | 8/2004 | Kim | |
| 7,197,472 B2 | 3/2007 | Conkwright et al. | |
| 7,746,272 B2 | 6/2010 | Vollath | |
| 7,865,916 B2 | 1/2011 | Beser et al. | |
| 7,954,120 B2 | 5/2011 | Roberts et al. | |
| 8,087,041 B2 | 12/2011 | Fu et al. | |
| 8,112,301 B2 | 2/2012 | Harvey et al. | |
| 8,149,162 B1 | 4/2012 | Pauls | |
| 8,171,032 B2 | 5/2012 | Herz | |
| 8,185,456 B2 | 5/2012 | LeClair et al. | |
| 8,200,693 B2 | 6/2012 | Steele et al. | |
| 8,214,518 B1 | 7/2012 | Bertz | |
| 8,370,489 B2 | 2/2013 | Mazumdar et al. | |
| 8,423,406 B2 | 4/2013 | Briggs | |
| 8,453,173 B1 | 5/2013 | Anderson et al. | |
| 8,619,892 B2 | 12/2013 | Vetter et al. | |
| 8,874,652 B1 | 10/2014 | Pecjak et al. | |
| 8,930,701 B2 | 1/2015 | Burbank et al. | |
| 8,973,023 B1 | 3/2015 | Rao et al. | |
| 9,070,139 B2 | 6/2015 | Zhang | |
| 9,094,710 B2 | 7/2015 | Lee et al. | |
| 9,111,186 B2 | 8/2015 | Blasinski et al. | |
| 9,224,094 B2 | 12/2015 | Oliver et al. | |
| 9,236,962 B2 | 1/2016 | Hawkins et al. | |
| 9,237,138 B2 | 1/2016 | Bosworth et al. | |
| 9,420,320 B2 | 8/2016 | Doe | |
| 9,529,836 B1 | 12/2016 | Hale | |
| 10,045,057 B2 | 8/2018 | Shah et al. | |
| 10,070,166 B2 | 9/2018 | Chaar et al. | |
| 10,237,419 B2 | 3/2019 | Shah et al. | |
| 10,313,752 B2 | 6/2019 | Nagaraja Rao et al. | |
| 10,382,818 B2 | 8/2019 | Sheppard et al. | |
| 10,491,696 B2 | 11/2019 | Gierada | |
| 10,602,224 B2 | 3/2020 | Sullivan et al. | |
| 10,609,451 B2 | 3/2020 | De Andrade et al. | |
| 10,681,414 B2 | 6/2020 | Sheppard et al. | |
| 10,743,064 B2 | 8/2020 | Berezowski et al. | |
| 10,856,027 B2 | 12/2020 | Sheppard et al. | |
| 11,115,710 B2 | 9/2021 | Sheppard et al. | |
| 11,140,449 B2 | 10/2021 | Sullivan et al. | |
| 11,216,834 B2 | 1/2022 | Sheppard et al. | |
| 11,323,772 B2 | 5/2022 | Sheppard et al. | |
| 11,425,458 B2 | 8/2022 | Sheppard et al. | |
| 11,438,662 B2 | 9/2022 | Sullivan et al. | |
| 11,483,606 B2 | 10/2022 | Sheppard et al. | |
| 11,523,177 B2 | 12/2022 | Sheppard et al. | |
| 11,553,226 B2 | 1/2023 | Sheppard et al. | |
| 2002/0123928 A1 | 9/2002 | Eldering et al. | |
| 2003/0037041 A1 | 2/2003 | Hertz | |
| 2004/0001538 A1 | 1/2004 | Garrett | |
| 2004/0059549 A1 | 3/2004 | Kropaczek et al. | |
| 2006/0190318 A1 | 8/2006 | Downey et al. | |
| 2007/0087756 A1 | 4/2007 | Hoffberg | |
| 2008/0028006 A1 | 1/2008 | Liu et al. | |
| 2008/0228543 A1 | 9/2008 | Doe | |
| 2008/0300965 A1 | 12/2008 | Doe | |
| 2008/0313017 A1 | 12/2008 | Totten | |
| 2010/0161385 A1 | 6/2010 | Karypis et al. | |
| 2010/0191723 A1 | 7/2010 | Perez et al. | |
| 2011/0015992 A1 | 1/2011 | Liffiton et al. | |
| 2011/0196733 A1 | 8/2011 | Li et al. | |
| 2012/0023522 A1 | 1/2012 | Anderson et al. | |
| 2012/0052930 A1 | 3/2012 | McGucken | |
| 2012/0066410 A1 | 3/2012 | Stefanakis et al. | |
| 2012/0072940 A1 | 3/2012 | Fuhrer | |
| 2012/0110027 A1 | 5/2012 | Falcon | |
| 2012/0254911 A1 | 10/2012 | Doe | |
| 2013/0138743 A1 | 5/2013 | Amento et al. | |
| 2013/0198125 A1 | 8/2013 | Oliver et al. | |
| 2013/0254787 A1 | 9/2013 | Cox et al. | |
| 2013/0290233 A1 | 10/2013 | Ferren et al. | |
| 2013/0339991 A1 | 12/2013 | Ricci | |
| 2013/0346033 A1 | 12/2013 | Wang et al. | |
| 2014/0101685 A1 | 4/2014 | Kitts et al. | |
| 2014/0112557 A1 | 4/2014 | Santamaria-Pang et al. | |
| 2014/0278933 A1 | 9/2014 | McMillan | |
| 2014/0280891 A1 | 9/2014 | Doe | |
| 2014/0337104 A1 | 11/2014 | Splaine et al. | |
| 2014/0358676 A1 | 12/2014 | Srivastava et al. | |
| 2015/0032310 A1 | 1/2015 | Zettel et al. | |
| 2015/0180989 A1 | 6/2015 | Seth | |
| 2015/0184652 A1 | 7/2015 | Srivastava et al. | |
| 2015/0193813 A1 | 7/2015 | Toupet et al. | |
| 2015/0332310 A1 | 11/2015 | Cui et al. | |
| 2015/0332317 A1 | 11/2015 | Cui et al. | |
| 2016/0012314 A1 | 1/2016 | Ramamurthy et al. | |
| 2016/0086208 A1 | 3/2016 | Oliver et al. | |
| 2016/0134934 A1 | 5/2016 | Jared et al. | |
| 2016/0162955 A1 | 6/2016 | O'Kelley et al. | |
| 2016/0165277 A1 | 6/2016 | Kirillov et al. | |
| 2016/0232563 A1 | 8/2016 | Perez et al. | |
| 2016/0249098 A1 | 8/2016 | Pecjak et al. | |
| 2016/0269783 A1 | 9/2016 | Mowrer et al. | |
| 2016/0323616 A1 | 11/2016 | Doe | |
| 2016/0373820 A1 | 12/2016 | Meyer et al. | |
| 2016/0379246 A1 | 12/2016 | Sheppard et al. | |
| 2017/0006342 A1 | 1/2017 | Nagaraja Rao et al. | |
| 2017/0034594 A1 | 2/2017 | Francis et al. | |
| 2017/0155956 A1 | 6/2017 | Nagaraja Rao et al. | |
| 2017/0187478 A1 | 6/2017 | Shah et al. | |
| 2017/0213243 A1 | 7/2017 | Dollard | |
| 2017/0300911 A1 | 10/2017 | Alnajem | |
| 2018/0073933 A1 | 3/2018 | Keskin et al. | |
| 2018/0189950 A1 | 7/2018 | Norouzi et al. | |
| 2018/0225709 A1 | 8/2018 | Ferber et al. | |
| 2018/0249208 A1 | 8/2018 | Sheppard et al. | |
| 2018/0249210 A1 | 8/2018 | Sheppard et al. | |
| 2018/0249211 A1 | 8/2018 | Sheppard et al. | |
| 2018/0249214 A1 | 8/2018 | Sullivan et al. | |
| 2018/0315060 A1 | 11/2018 | Sheppard et al. | |
| 2018/0376198 A1 | 12/2018 | Sheppard et al. | |
| 2019/0147461 A1 | 5/2019 | Sheppard et al. | |
| 2019/0289363 A1 | 9/2019 | Nagaraja Rao et al. | |
| 2019/0354574 A1 | 11/2019 | Wick et al. | |
| 2019/0356950 A1 | 11/2019 | Sheppard et al. | |
| 2019/0370860 A1 | 12/2019 | Morovati Lopez et al. | |
| 2020/0120387 A1 | 4/2020 | Sheppard et al. | |
| 2020/0175546 A1 | 6/2020 | Perez et al. | |
| 2020/0204863 A1 | 6/2020 | Sullivan et al. | |
| 2020/0294069 A1 | 9/2020 | Sheppard et al. | |
| 2020/0296441 A1 | 9/2020 | Sheppard et al. | |
| 2020/0359090 A1 | 11/2020 | Sheppard et al. | |
| 2021/0014564 A1 | 1/2021 | Sheppard et al. | |
| 2021/0058659 A1 | 2/2021 | Sheppard et al. | |
| 2021/0065230 A1 | 3/2021 | Flynn | |
| 2021/0133773 A1 | 5/2021 | Sheppard et al. | |
| 2021/0158377 A1 | 5/2021 | Sheppard et al. | |
| 2021/0319002 A1 | 10/2021 | Ryan et al. | |
| 2021/0319474 A1 | 10/2021 | Sheppard et al. | |
| 2021/0400341 A1 | 12/2021 | Sheppard et al. | |
| 2022/0038781 A1 | 2/2022 | Sullivan et al. | |
| 2022/0058667 A1 | 2/2022 | Sheppard et al. | |
| 2022/0058688 A1 | 2/2022 | Sheppard et al. | |
| 2022/0122104 A1 | 4/2022 | Sheppard et al. | |
| 2022/0159326 A1 | 5/2022 | Sheppard et al. | |
| 2022/0264179 A1 | 8/2022 | Sheppard et al. | |
| 2022/0264187 A1 | 8/2022 | Sheppard et al. | |
| 2022/0408154 A1 | 12/2022 | Sheppard et al. | |
| 2023/0042879 A1 | 2/2023 | Sheppard et al. | |

(56) References Cited

U.S. PATENT DOCUMENTS

| | | | |
|---|---|---|---|
| 2023/0070980 A1 | 3/2023 | Sullivan et al. |
| 2023/0111617 A1 | 4/2023 | Sheppard et al. |

FOREIGN PATENT DOCUMENTS

| | | |
|---|---|---|
| WO | 2008127737 | 10/2008 |
| WO | 2014210597 | 12/2014 |

OTHER PUBLICATIONS

Golub et al., "Linear Least Squares and Quadratic Programming," Technical Report No. CS 134, Stanford University, Computer Science Department, May 1969, 38 pages.

Charles L. Byrne, "Iterative Algorithms in Inverse Problems," Apr. 25, 2006, 347 pages.

Charles L. Byrne, "Applied Iterative Methods," Jan. 23, 2007, 396 pages.

Bourguignon et al., "On the Construction of Synthetic Panels," Oct. 2015, 42 pages.

Marno Verbeek, "Pseudo-Panels and Repeated Cross-Sections," The Econometrics of Panel Data, Springer-Verlag Berlin Heidelberg 2008, 15 pages.

P.J.G. Teunissen, "Least-Squares Estimation of the Integer GPS Ambiguities," Delft University of Technology, Department of the Geodetic Engineering, Aug. 1993, 16 pages.

United States Patent and Trademark Office, "Non-Final Office action" issued in connection with U.S. Appl. No. 15/445,530, dated Apr. 11, 2018, 10 pages.

United States Patent and Trademark Office, "Notice of Allowance," issued in connection with U.S. Appl. No. 15/445,530, dated Jan. 2, 2019, 7 pages.

United States Patent and Trademark Office, "Notice of Allowance," issued in connection with U.S. Appl. No. 15/445,530, dated May 3, 2019, 5 pages.

United States Patent and Trademark Office, "Notice of Allowability," issued in connection with U.S. Appl. No. 15/445,530, dated May 21, 2019, 2 pages.

United States Patent and Trademark Office, "Notice of Allowance and Fee(s) Due," issued in connection with U.S. Appl. No. 15/445,530, dated Sep. 25, 2019, 5 pages.

Haggin, Patience et al., "Google Nears a Long-Tipped Limit on Tracking "Cookies," in Blow to Rivals," The Wall Street Journal, May 6, 2019, obtained from https://www.wsj.com/articles/googles-new-privacy-tools-to-make-cookies-crumble-competitors-stumble-11557151913, 3 pages.

United States Patent and Trademark Office, "Notice of Allowance," issued in connection with U.S. Appl. No. 15/445,530, dated Jan. 31, 2020, 10 pages.

International Searching Authority. "International Search Report & Written Opinion", issued in connection with application No. PCT/US2020/022438 dated Jul. 6, 2020, 10 pages.

United States Patent and Trademark Office, "Non-Final Office action" issued in connection with U.S. Appl. No. 15/635,153, dated Feb. 5, 2018, 8 pages.

United States Patent and Trademark Office, "Final Office Action," issued in connection with U.S. Appl. No. 16/526,747, dated Dec. 30, 2020, 9 pages.

United States Patent and Trademark Office, "Non-Final Office Action," issued in connection with U.S. Appl. No. 16/355,386, dated Nov. 9, 2020, 8 pages.

United States Patent and Trademark Office, "Non-Final Office Action," issued in connection with U.S. Appl. No. 16/526,747, dated Jul. 23, 2020, 8 pages.

United States Patent and Trademark Office, "Notice of Allowance," issued in connection with U.S. Appl. No. 16/355,393, dated Jul. 8, 2020, 8 pages.

United States Patent and Trademark Office, "Non-Final Office Action," issued in connection with U.S. Appl. No. 16/893,129, dated Apr. 13, 2021, 8 pages.

United States Patent and Trademark Office, "Notice of Allowance," issued in connection with U.S. Appl. No. 16/526,747, dated Apr. 28, 2021, 8 pages.

United States Patent and Trademark Office, "Final Office Action," issued in connection with U.S. Appl. No. 16/355,386, dated May 4, 2021, 10 pages.

United States Patent and Trademark Office, "Notice of Allowance" issued in connection with U.S. Appl. No. 15/635,153, dated Jul. 23, 2018, 8 pages.

United States Patent and Trademark Office, "Notice of Allowance," issued in connection with U.S. Appl. No. 15/635,153, dated Oct. 17, 2018, 5 pages.

United States Patent and Trademark Office, "Notice of Allowance," issued in connection with U.S. Appl. No. 15/635,153, dated Mar. 21, 2019, 7 pages.

United States Patent and Trademark Office, "Notice of Allowability," issued in connection with U.S. Appl. No. 15/635,153, on Apr. 8, 2019, 2 pages.

United States Patent and Trademark Office, "Corrected Notice of Allowability," issued in connection with U.S. Appl. No. 16/893,129, dated Dec. 22, 2021, 2 pages.

United States Patent and Trademark Office, "Corrected Notice of Allowability," issued in connection with U.S. Appl. No. 16/526,747, dated Aug. 11, 2021, 3 pages.

United States Patent and Trademark Office, "Non-Final Office Action," issued in connection with U.S. Appl. No. 17/734,792, dated Oct. 13, 2022, 6 pages.

United States Patent and Trademark Office, "Notice of Allowance," issued in connection with Application No. 16/893,129, dated Jul. 29, 2021, 5 pages.

United States Patent and Trademark Office, "Notice of Allowance," issued in connection with U.S. Appl. No. 16/355,386, dated Aug. 30, 2021, 7 pages.

International Searching Authority. "International Preliminary Report on Patentability". issued in connection with application No. PCT/US2020/022438 dated Sep. 16, 2021, 6 pages.

International Searching Authority. "International Preliminary Report on Patentability", issued in connection with application No. PCT/US2020/022436 dated Sep. 16, 2021, 5 pages.

United States Patent and Trademark Office, "Notice of Allowance," issued in connection with U.S. Appl. No. 16/893,129, dated Dec. 14, 2021, 5 pages.

United States Patent and Trademark Office, "Corrected Notice of Allowability," issued in connection with U.S. Appl. No. 16/355,386, dated Dec. 9, 2021, 2 pages.

United States Patent and Trademark Office, "Corrected Notice of Allowability," issued in connection with U.S. Appl. No. 16/893,129, dated Apr. 8, 2022, 2 pages.

Esch et al., "Appendix 8 Numerical Methods for Solving Nonlinear Equations," Asset and Risk Management: Risk Oriented Finance, published 2005 by John Wiley & Sons Ltd., 7 pages.

United States Patent and Trademark Office, "Non-Final Office Action," issued in connection with U.S. Appl. No. 17/567,710, dated Oct. 14, 2022, 8 pages.

United States Patent and Trademark Office, "Non-Final Office Action," issued in connection with U.S. Appl. No. 17/465,567, dated Nov. 16, 2022, 12 pages.

United States Patent and Trademark Office, "Notice of Allowance and Fee(s) Due," issued in connection with U.S. Appl. No. 17/734,792, dated Feb. 13, 2023, 8 pages.

United States Patent and Trademark Office, "Notice of Allowance and Fee(s) Due," issued in connection with U.S. Appl. No. 17/567,710, dated Feb. 10, 2023, 7 pages.

United States Patent and Trademark Office, "Notice of Allowance and Fee(s) Due," issued in connection with U.S. Appl. No. 17/465,567, dated Mar. 10, 2023, 7 pages.

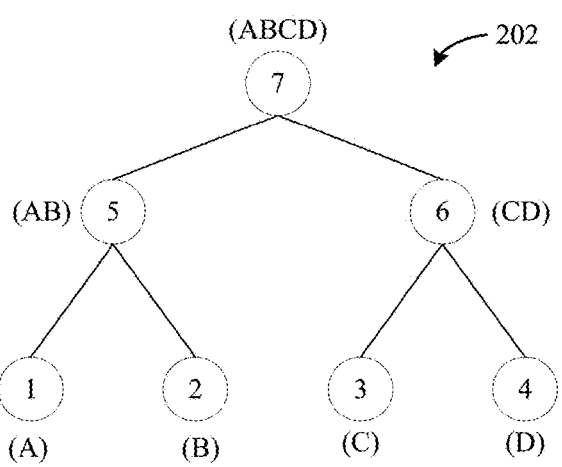
FIG. 2A
FIG. 2B
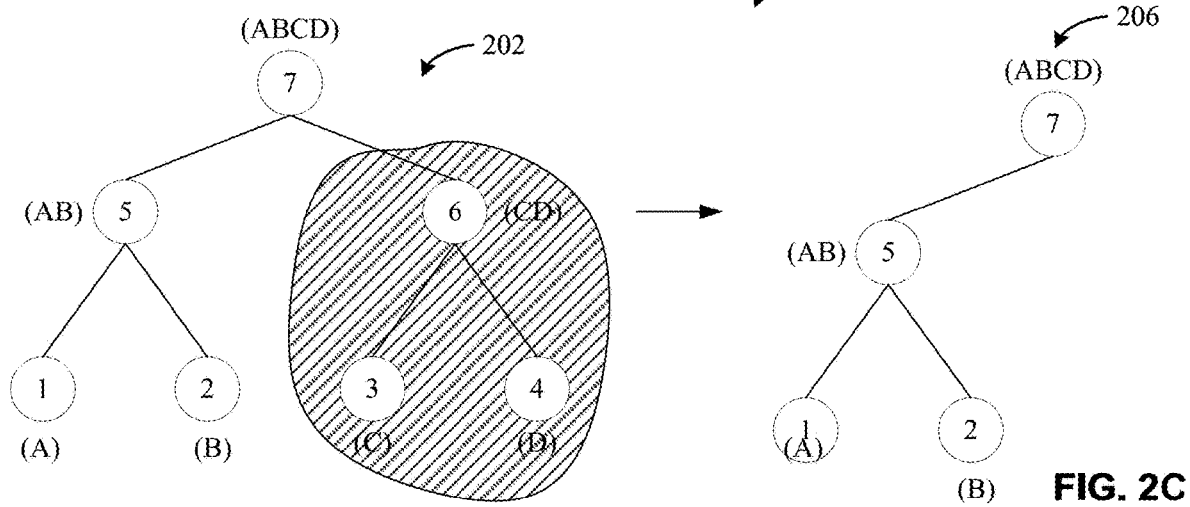
FIG. 2C

METHODS AND APPARATUS TO ESTIMATE POPULATION REACH FROM DIFFERENT MARGINAL RATING UNIONS

RELATED APPLICATION

This patent arises from a continuation of U.S. patent application Ser. No. 17/093,460, (Now U.S. Pat. No. 11,483,606), filed on Nov. 9, 2020, which is a continuation of U.S. patent application Ser. No. 16/355,393, (Now U.S. Pat. No. 10,856,027) filed on Mar. 15, 2019. U.S. patent application Ser. No. 17/093,460 and U.S. patent application Ser. No. 16/355,393 are hereby incorporated herein by reference in their entireties. Priority to U.S. patent application Ser. No. 17/093,460 and U.S. patent application Ser. No. 16/355,393 is hereby claimed.

FIELD OF THE DISCLOSURE

This disclosure relates generally to media audience measurement, and, more particularly, to methods and apparatus to estimate population reach from different marginal rating unions.

BACKGROUND

Determining a size and demographics of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a group of media consumers (often called panelists) to cooperate in an audience measurement study (often called a panel) for a predefined length of time. In some examples, the audience measurement entity obtains (e.g., directly, or indirectly from a media service provider) return path data (e.g., census data representative of a population of users) from media presentation devices (e.g., set-top boxes) that identifies tuning data from the media presentation device. In such examples, because the return path data may not be associated with a known panelist, the audience measurement entity models and/or assigns viewers to represent the return path data. Additionally, the media consumption habits and demographic data associated with the enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

BRIEF DESCRIPTION OF THE DRAWINGS

FIGS. 2A-C illustrate example panelist data and census data and corresponding tree structure to represent such data.

In general, the same reference numbers will be used throughout the drawing(s) and accompanying written description to refer to the same or like parts.

Figure 1:
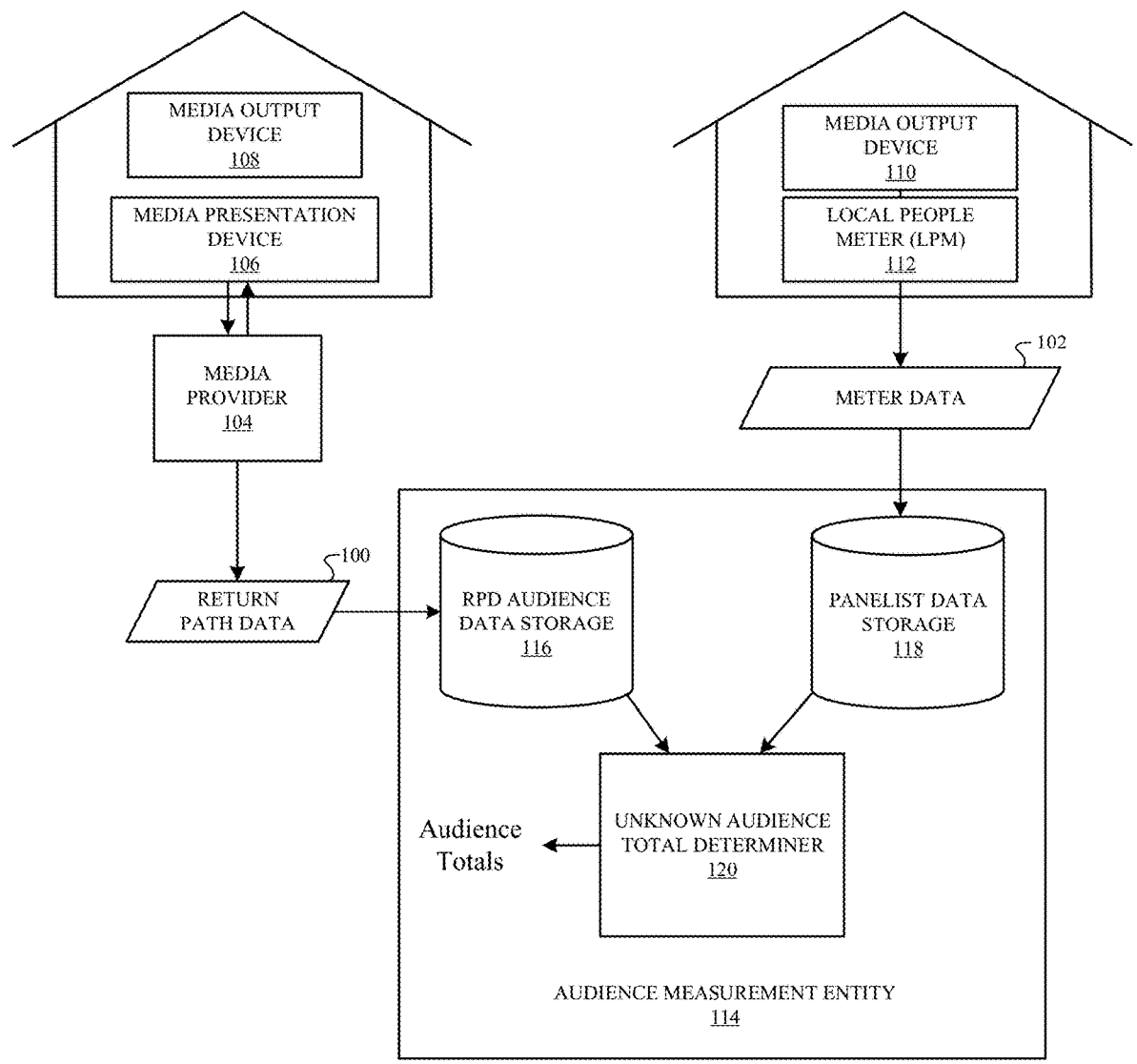
FIG. 1 is a block diagram of an example environment in which return path data and meter data are collected from media presentation locations and are analyzed by an example audience measurement entity to estimate media reach for a population for different unions of audience marginal ratings data.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Audience measurement entities seek to understand the composition and size of audiences of media, such as television programming. Such information allows audience measurement entity researchers to, for example, report advertising delivery and/or targeting statistics to advertisers that target their media (e.g., advertisements) to particular audiences. Additionally, such information helps to establish advertising prices commensurate with audience exposure and demographic makeup (referred to herein collectively as "audience configuration"). One way to gather media presentation information is to gather the media presentation information from media output devices (e.g., gathering television presentation data from a set-top box (STB) connected to a television). As used herein, media presentation includes media output by a media device regardless of whether or not an audience member is present (e.g., media output by a media output device at which no audience is present, media exposure to an audience member(s), etc.).

A media presentation device (e.g., STB) provided by a service provider (e.g., a cable television service provider, a satellite television service provider, an over-the-top (OTT) service provider, a music service provider, a movie service provider, a streaming media provider, etc.) or purchased by a consumer may contain processing capabilities to monitor, store, and transmit tuning data (e.g., which television channels are tuned by the media presentation device at a particular time) back to the service provider, which can then aggregate and provide such return path data to an audience measurement entity (e.g., The Nielsen Company (US), LLC.) to analyze media presentation activity. Data transmitted from a media presentation device back to the service provider is referred to herein as return path data which may include census data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data related to the user viewing the media corresponding to the media presentation device. Accordingly, return path data may not be able to be associated with specific viewers, demographics, locations, etc. However, census data may be derived or extracted from return path data. Census data is indicative of the total percentage of a population of users (e.g., based on the return path data) that was exposed to media at a particular margin. For example, if 20% of a population was exposed to a first margin (e.g., a first 15 minute segment) of a television show, the census data may be indicative the 20% exposure.

To determine aspects of media presentation data (e.g., which household member is currently consuming a particular media and the demographics of that household member), market researchers may perform audience measurement by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), such as a metering device(s) and/or a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a group of LPMs monitoring a group of panelist households. The metering data may include, but are not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, selected stream, an address for media (e.g., a network address), and/or any other identifier for a source and/or carrier of media.

Examples disclosed herein receive the marginal media exposure data (e.g., different episodes of a television series, different quarter hour time slots of a television program, or a radio program, etc.) for different unions of marginal data and/or smaller unions and estimates a total population reach (e.g., a total number of deduplicated users that were exposed to media) across all of the different unions. As used herein, a margin or marginal is a subpart of media. For example, if the media corresponds to advertisement, the margins may be different websites that include the advertisement. In another example, if the media corresponds to a one-hour program, the margins may be 4 15-minute increments of the one-hour program. As used herein, a union can be made up of smaller unions (e.g., a union of smaller unions of marginals, such as a union of smaller unions of time-periods) and/or individual marginals (e.g., time-periods, such as quarter hours). For example, a first union may include a first quarter hour marginal and a second subsequent quarter hour marginal, a second union may include a third, fourth, and fifth quarter hour marginal, and a third union may include the first union and the second union. As used herein, child unions or children are the marginal time intervals and/or smaller unions that make up a larger union and a parent union or a parent is a larger union that includes the child union(s) and/or children. Using the above example, the children of the first union include the first quarter hour marginal and the second quarter hour marginal and the parent of the first union is the third union.

In some examples, the audience measurement entity processes the collected and/or aggregated metering data from panelist meters and obtains (e.g., from one or more service provider) return path data for devices where a panel is not maintained. Return path data may include, for example, a total number of or a percentage of unique users (e.g., deduplicated users) from a universe of users that was exposed to media within different margins (e.g., 15 minute increments) of time. However, return path data may be missing a total number of or a percentage of unique users from a universe of users that was exposed to the media within two or more margins of time (e.g., unions). Examples disclosed herein leverage panelist data to be able to estimate unique audiences of universe (e.g., herein also referred to as population) and/or reach(es) across different unions of time. As used herein, reach is a cumulative percentage or total of a population that has been counted as a viewer of the media at least once during a specified time interval (e.g., hourly, daily, weekly, monthly, etc.).

Some traditional techniques of determining the total population reach for a union of marginal media ratings data include numerical calculations that enumerate all combinations in which someone can watch a program based on the individual marginal media ratings of making up the union. The number of probabilities to be solved by such traditional techniques is $2^n$ number of probabilities, where n is the number of marginal probabilities provided in the marginal ratings data (e.g., the ratings for the different possible instances of media exposure) of each union. For example, if reach is to be calculated across 4 quarter hours (e.g., for an hour-long media exposure), which corresponds to four possible marginal ratings, the total number of probabilities to be solved using such a traditional technique is 16 (e.g., $2^4$). If the reach is to be calculated across 96 quarter hours (e.g., a day-long media exposure), the total number of probabilities to be solved using such a traditional technique is $8*10^{28}$ (e.g., $2^{96}$), thereby exceeding the memory limit and/or processing power of any existing computer. Examples disclosed herein alleviate such memory/processing resource problems associated with such a traditional technique by calculating the solution using the disclosed analytical process.

To estimate the total population reach of a union (e.g., population union reach), examples disclosed herein develop a tree graph association or tree association for the margins and union(s). The tree graph association corresponds to the structure of the margins and/or unions where each margin and each union corresponds to a node. Examples disclosed herein tag each node as a descendant (e.g., child, grandchild, etc.) and/or ancestor (e.g., parent, grandparent, etc.) depending on the structure of the unions corresponding to stored panel data. For example, if panel data includes a unique audience number or percentage corresponding to three margins (e.g., A, B, and C) and the panel data further includes a unique audience number or percentage corresponding to a first union (e.g., AB) and a second union (e.g., ABC), examples disclosed herein may tag (1) nodes A and B as having parent AB and grandparent ABC, (2) node C as having parent ABC, (3) node AB as having children A and B and parent ABC, and (4) node ABC as having children AB and C and grandchildren A and B. Additionally, examples disclosed herein may tag the margin nodes (e.g., A, B, and C) as leaves and tag ABCD as a root. As used herein, a leaf is a node that does not have children and a root is a node that has no parents.

As described above, the census data (e.g., corresponding to the population or total audience) may include unique audience data related to particular margins, but may not include unique audience data for unions of the margins. Accordingly, once the tree structure association is complete, examples disclosed herein utilize the panel data and corresponding tree structure association to solve for unique audience(s) (e.g., reach(es)) of unions of the population based on the census data. The unique audience of a particular union corresponding to a node of the tree structure association can be determined by taking the difference between the total audience and the total audience of the union that was removed from the tree structure association (e.g., the statistical rule of subtraction), as shown the below-Equation 1. Examples disclosed herein leverage Equation 1 to determine unique audiences for a population union.

$$\text{AUD}(X) = \text{AUD}(T) - A(T \backslash X) \quad \text{(Equation 1)}$$

In Equation 1 above, AUD(X) represents the unique audience of union or margin X (e.g., the audience which belonged to at least one of the margins corresponding to union X), AUD(T) represents the total audience, and AUD (T\X) represents the total audience excluding the audience members of union X. In some examples, the total audience AUD(T) may be known (e.g., for panelist data). The total audience AUD(T) corresponds to the below-Equation 2.

$$\text{AUD}(T) = z_0 z_N s_N \quad \text{(Equation 2)}$$

In Equation 2 above, $z_0$ corresponds to a normalize constraint, N corresponds to the node of the total audience, $z_i = e^{\lambda_i}$, where $\lambda$ is an unknown Lagrange multiplier (e.g., which can be solved for), and $s_N$ is defined recursively by node height (e.g., margins being nodes at the lowest height, unions of margins being at the next height, etc.) based on the tree association using the Equation 3, as shown below.

$$s_i = \begin{cases} 1, & \text{if node } i \text{ is a leaf} \\ \prod_{j \in children(i)} (1 + s_j z_j) - 1, & \text{if node } i \text{ has children} \end{cases} \quad \text{(Equation 3)}$$

As used herein, node height refers to the level or hierarchy level of the tree structure. For example, all the leaf nodes (e.g., margins) correspond to the lowest height and the root node (e.g., the union corresponding to all leaf nodes of a tree association structure) corresponds to the highest height. As the calculations of $s_i$ depend on its children, if any, examples disclosed herein utilize parallel commercial solvers to solve for $s_i$ in parallel (e.g., independently) at each height to be combined at a later height.

As described above AUD(T\X) corresponds to the audience of T when the audience of the union and/or margin X is removed from the tree structure, so the new graph only contains people who visited anything other than X. Because removing a union and/or margin X only affects the ancestors of X, AUD(T\X) can be determined based on the below-Equation 4. Utilizing Equation 4 reduces the number of computations for tree structure associations (e.g., the larger the number of nodes in the tree structure association, the larger the reduction of computations), because updating the ancestors to compute AUD(T\X) (e.g., using the below Equation 4) can be done in parallel, once for each node. Although new tree associations can be calculated for each node removal graph to determine the total audience of Equation 3, Equation 4 utilizes the property that the only $s_i$ variables which are impacted by node deletion are the ancestors of that node.

$$\text{AUD}(T \backslash X) = z_0 z_N s_N^{(new)} \quad \text{(Equation 4)}$$

In Equation 4 above, $s_N^{(new)}$ is defined recursively by node height (e.g., margins being nodes at the lowest height, unions of margins being at the next height, etc.) when the X union and/or margin is removed. $s_N^{(new)}$ can be determined using the Equation 5, as shown below.

$$s_{k_j}^{(new)} = \begin{cases} \dfrac{s_{k_1}+1}{1+s_{k_0}z_{k_0}} - 1, & j = 1 \\ \left(\dfrac{s_{k_j}+1}{1+s_{k_{j-1}}z_{k_{j-1}}}\right)\left(1 + s_{k_{j-1}}^{(new)} z_{k_{j-1}}\right) - 1, & j = 2, \ldots, J \end{cases} \quad \text{(Equation 5)}$$

In the preceding equation, $k_j$ is the node representing the $j^{th}$ ancestor of X (e.g., $k_0$ is X, $k_1$ is the parent of X, ..., $k_J$ is node N, the root node). As the calculations of $s_{k_j}$ depend on its children, if any, examples disclosed herein, when solving for $s_{k_j}$ can utilize parallel commercial solvers to solve for $s_{k_j}$ in parallel (e.g., independently) at each height to be combined at a later height.

Equation 1 (e.g., corresponding to Equations 2-5) results in a system of equations with variable Lagrange multipliers ($\lambda$s). Examples disclosed herein determine the unique audience of one or more unions based on census data corresponding to the margins and panelist data corresponding to the margins and the unions by performing three tasks corresponding to Equation 1. The first task includes solving a system of Equations corresponding to the below Equations 6 and 7 with respect to the panelist data.

$$\text{AUG}(T) - \text{AUD}(T \backslash \{i\}) = A_i \text{ for all nodes of the tree structure association } i = \{1, \ldots, N\} \quad \text{(Equation 6)}$$

$$z_0 + \text{AUG}(T) = 100\% \quad \text{(Equation 7)}$$

In Equation 7 above, $z_0$ represents the total audience (e.g., panelist audience) count that was not exposed to the media. Equations 6 and 7 correspond to a system of equations with $\lambda$s as solutions to the system. Estimates of AUD(T\{i}) (corresponding to the above Equations 4 and 5) can be determined using commercial solvers in parallel. The commercial solvers estimating values for the $\lambda$s of AUD(T\{i}) and iteratively adjusting such that until all the constraints of Equations 6 and 7 are met. Because AUG(T) is known in panelist data, it follows that $\lambda_0 = \ln(1-A_N)$, where $A_N$ is AUD(T). Although it is assumed all quantities of audiences in the above Equations are expressed in percentages of the Universe Estimate (e.g., Equation 7 illustrates that for total population), Equations 1-7 may be used in conjunction with audience totals by slightly adjusting the Equations.

Once the first task is complete, examples disclosed herein perform a second task in which a first subset of the $\lambda$s (e.g., $\lambda_{M+1}$–$\lambda_N$) corresponding to unions of the tree structure association are kept (e.g., the $\lambda$s corresponding to unknowns in the census data) and a second subset of the $\lambda$s (e.g., $\lambda_o$–$\lambda_M$) corresponding to margins of the tree structure association are discarded (e.g., the $\lambda$s corresponding to knowns in the census data). However, different subsets of the $\lambda$s may be kept and/or discarded based on the census data. For example, if the census data includes data related to a first margin, a second margin, a third margin, and a first union and is missing data related to a fourth margin and a second union, the subset of $\lambda$s that are kept will correspond to the fourth margin and the second union and the subset of $\lambda$s that are discarded will correspond to the first margin, the second margin, the third margin and the first union. In response to discarding the first set of $\lambda$s, examples disclosed herein solve the system corresponding to Equations 6 and 7 using the census data, the unknown Lagrange multipliers (e.g., $\lambda_o$–$\lambda_M$), and the known kept Lagrange multipliers of the first task (e.g., $\lambda_{M+1}$–$\lambda_N$), thereby resulting in a set of second task-based Lagrange multipliers $\lambda \hat{s}$ based on both the panelist data and the census data. As used herein the hat notation (^) corresponds to the solutions to systems of equations based on the second task (e.g., including panelist and census data). Once the second task is complete, examples disclosed herein perform a third task to solve for the missing population unions using the below Equation 8.

$$\text{AUD}(G) - (\text{AUD}(G\setminus\{j\}) = \hat{A}_j \text{ where } j = \{M+1, \ldots, N\} \quad \text{(Equation 8)}$$

FIG. 1 is a block diagram of an environment in which example return path data 100 and example meter data 102 are collected to determine reach(es) based on marginal ratings data unions. FIG. 1 includes the example return path data 100, the example meter data 102, an example media provider 104, an example media presentation device 106, example media output devices 108, 110, an example local people meter (LPM) 112, and an example audience measurement entity (AME) 114. The example audience measurement entity 114 includes an example return path data (RPD) audience storage 116, an example panelist data storage 118, and an example union population reach determiner 120.

The example media provider 104 of FIG. 1 is a service provider (e.g., cable media service provider, a radio frequency (RF) media provider, a satellite media service provider, etc.) that presents media to an audience member via the example media presentation device 106. The media provided by the example media provider 104 is transmitted (e.g., via a wired or wireless network connection) to the media presentation device 106. The media presentation device 106 is connected, via a wired or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is operating to access media, the media presentation device 106 receives media corresponding to a station, program, website, etc., based on the tuning of the example media presentation device 106. For example, the media presentation device 106 may be a set-top box. Additionally or alternatively, the example media presentation device 106 may be an over-the-top (OTT) device, a video game console, a digital video recorder (DVR), a digital versatile disc (DVD) player, a receiver, a router, a server, a computer, a mobile device, software executed by a website, computer, and/or application, and/or any device that receives media from a service provider. For example, the media presentation device 106 may be a website and/or application that provides media to users via the media output device 108. In some examples, the media presentation device 106 may implement a DVR and/or DVD player. In some examples, the example media presentation device 106 includes a unique serial number that, when associated with subscriber information, allows an audience measurement entity, a marketing entity, and/or any other entity to ascertain specific subscriber behavior information.

By way of example, the example media presentation device 106 may be tuned to channel 5. In such an example, the media presentation device 106 outputs media (from the example media provider 104) corresponding to the tuned channel 5. The media presentation device 106 may gather tuning data corresponding to which channels, stations, websites, etc., that the example media presentation device 106 was tuned. The example media presentation device 106 generates and transmits the example return path data 100 (e.g., census data corresponding to the total population of users) to the example media provider 104. The example return path data 100 includes the tuning data and/or data corresponding to the example media provider 104. Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 from any number or type(s) of media presentation devices, at any number of locations. The media provider 104 transmits the collected return path data 100 to the example audience measurement entity 114. Additionally or alternatively, the audience measurement entity 114 may be hosted by any other entity or may be co-hosted by another entity (ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement entity 114 cooperating with the media provider to gain access to the tuning data. The example audience measurement entity 114 includes the example return path data audience storage 116 (e.g., a database) and the example panelist data storage 118 (e.g., a database).

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna and does not correspond to a media provider (e.g., including the example media provider 104). In the illustrated example of FIG. 1, the media output device 110 corresponds to one or more monitored panelists. The example LPM 112 monitors the panelists exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable of presenting media to a user. The LPM 112 may be a portable people meter, a cell phone, a computing device, a sensor, and/or any other device capable of metering (e.g., monitoring) user exposure to media. In some examples, a media presentation location may include a group of LPMs 112. In such examples, the group of the LPMs 112 may be used to monitor media exposure for multiple users and/or media output devices 110. Additionally, the example panelist data storage 118 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In other examples, the LPM 112 may include at least one sensor (e.g., a camera, a 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the media output device 110 is on and a user is present). The example meter data 102 may further include a household identification, a tuner key, a presentation start time, a presentation end time, a channel key, etc. Although the illustrated example illustrates the example audience measurement entity 114 collecting the example meter data 102 from one LPM 112 at one location, the example audience measurement entity 114 may collect meter data from any number or type of meters at any number of locations.

The example return path data 100 of FIG. 1 from the example media presentation device 106 and/or the example meter data 102 from the example LPM 112 is transmitted to the example audience measurement entity 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet medium, a digital subscriber line (DSL), a telephone line, a coaxial cable, or any wireless connection, etc.

The example return path data audience storage 116 of the example AME 114 of FIG. 1 collects the example return path data 100 corresponding to the example media presentation device(s) 106. As described above, the example return path data 100 includes tuning data of the example media presentation device 106. However, in some examples, the example return path data 100 may not include specific data identifying any information relating to the audience of the example media output device 108. In such examples, another device and/or processor models such audience information prior to storing in the example return path data audience storage 116. For example, the device and/or processor may assign and/or model virtual users to augment the example return path data 100, thereby generating audience assigned return path data.

The example union population reach determiner 120 of FIG. 1 receives the recorded audience marginal ratings for different time-periods (e.g., quarter hours, half hours, hours, days, etc.) of the media from the example panelist data storage 118, the population (e.g., based on census data) marginal ratings for the different marginals (e.g., time periods) of the media from the RPD audience data storage 116, the total reach of the recorded audience from the different marginal ratings from the panelist data storage 118, and a total population size (e.g., the universe estimate) from one or more devices from either the RPD audience data storage 116, the panelist data storage 118, and/or any other storage. Additionally, the example union population reach determiner 120 may receive union data related to unions of the different marginals and/or may be structured to develop preset unions based on margins of a particular media. For example, the union population reach determiner 120 may receive unions based on instructions from a user and/or a manufacturer. The received unions may be representative of half hour, hour, daypart, and/or any combination of time interval corresponding to some or all of the quarter hours for a particular day. In some examples, a union may include multiple unions. For example, union ABCD (e.g., 15 minute margins of an hour show) may be a union of union AB (e.g., a first union of the first two 15 minute increments representative of the unique panel audience of the first 30 minutes of the show) and union CD (e.g., a first union of the first two 15 minute increments representative of the unique panel audience of the second 30 minutes of the show), where union AB is a union of marginal A and marginal B and union CD is a union of marginal C and marginal D. Each union may have corresponding descendants and/or ancestors. Using the above example, the parent of union AB is union ABCD and the children of union AB are A and B. Each union corresponds to a union reach (e.g., a deduplicated number of people exposed to media across all marginals in the union). The example union population reach determiner 120 generates a tree structure association by tagging each node (e.g., each margin or union) with the corresponding descendants and/or ancestors. The example union population reach determiner 120 determines the unique panelist audience count percentage by processing the received panelist data. For example, if the union population reach determiner 120 is to determine a reach across two margins, A and B, the union population reach determiner 120 will process the panelist counts corresponding to the reach of A and the panelist counts corresponding to the reach of B to determine the duplication and determine the reach across AB to be the sum of A and B minus the duplication.

Once the example union population reach determiner 120 of FIG. 1 determines the panelist reach values of the unions, the union population reach determiner uses the above Equations 1-7 to perform three tasks to determine the reach(es) of one or more of the unions for the population. The union population reach determiner 120 executes the first task by utilizing commercial solvers to determine $\lambda$s from a system of equations corresponding to Equations 6 and 7 based on the panelist data. The union population reach determiner 120 executes the second task by utilizing commercial solvers to discard a first subset of the $\lambda$s corresponding to known census data from the first task (e.g., returning the corresponding $\lambda$s to variables) and keep a second subset of the $\lambda$s corresponding to unknown census data from the first task. For example, if the census data is known for the margins and the census data is unknown for the unions, the union population reach determiner 120 executes the second task by utilizing commercial solvers to discard a first subset of the $\lambda$s corresponding to the margins of the first task and keep a second subset of the $\lambda$s corresponding to the union of the first task. The union population reach determiner 120 determines the second task-based Lagrange multipliers $\lambda\hat{s}$ (e.g., corresponding to the now variable $\lambda$s corresponding to the margins) from a system of equations corresponding to Equations 6 and 7 based on the second subset of the $\lambda$s from the first task and the census data corresponding to the margins. The union population reach determiner 120 executes the third task by solving for the missing population unions using $AUD(G)-(AUD(G\setminus\{j\}))=\hat{A}_j$ where j= $\{M+1, \ldots, N\}$, where $M+1, \ldots, N$ represent the nodes corresponding to the discarded first subset of $\lambda$s from the second task. The example union population reach determiner 100 is further described below in conjunction with FIG. 3.

FIGS. 2A-C illustrates an example transformation of example marginal and union data and a corresponding representation of a tree structure association that may be generated by the example union population reach determiner 120 of FIG. 1. FIG. 2A includes example marginal and union data 200. FIG. 2B includes an example tree structure 202. FIG. 2C includes an example tree structure conversion 204 corresponding to a removal of a node, and an example node removal tree structure 206.

The example marginal and union data 200 of FIG. 2A corresponds to the percentage of the panel and/or the population that was exposed to media at different margins and/or unions based on the return path data 100 stored in the example RPD audience data storage 116 and the meter data 102 stored in the example panelist data storage 118. For example, the union population reach determiner 120 may be instructed (e.g., based on user, manufacturer, and/or preset instructions) to generate reaches (e.g., a unique deduplicated audience for the population) across union AB, union CD, and union ABCD. In such an example, the union population reach determiner 120 accesses the panelist data corresponding to the margins that make up the unions to determine the percentage of panelists that were exposed to the media at margin A, B, C, D and the percentage of panelists that were exposed to the media at unions AB, BC, and ABCD. Accordingly, the union population reach determiner 120 processes the panelist data storage 118 to remove duplicate panelist data for the unions (e.g., panelist that were included more than one margin corresponding to a union).

For example, as shown in the marginal and union data 200 of FIG. 2A, the union population reach determiner 120 determines that 10% (e.g., 0.1) of the panelists were exposed to the media during margin A (e.g., a first 15-minute duration of an hour program), 20% of the panelists were exposed to the media during margin B (e.g., a second 15-minute duration of the hour program), 30% of the panelists were exposed to the media during margin C (e.g., a third 15-minute duration of the hour program), 40% of the panelists were exposed to the media during margin D (e.g., a fourth 15-minute duration of the hour program), 25% of the panelists were exposed to the media during union AB (e.g., a first 30-minute duration of the hour program including the first and second 15-minute durations), 55% of the panelists were exposed to the media during union CD (e.g., a second 30-minute duration of the hour program including the third and fourth 15-minute durations), and 70% of the panelists were exposed to the media during union ABCD (e.g., the entire duration of the hour program including the first and second 30-minute durations). Additionally, the union population reach determiner 120 obtains census data corresponding to the percentage of the population that corresponds to the exposure of the media at the margins A, B, C, and D based on the return path data 100. The census data may be stored in the example RPD audience data storage 116 as a percentage of the population exposed to the media at the margin or may be a number of persons exposed to the media at the margin. When the census data corresponds to a number of persons, the union population reach determiner 120 may convert the number into a percentage by dividing the number of persons by the total population or total population estimate. In the example of FIG. 2A, the union population reach determiner 120 determines that 20% of the population of users was exposed to the first margin A, 40% of the population of users was exposed to the second margin B, 60% of the population of users was exposed to the third margin C, and 80% of the population of users was exposed to the fourth margin D.

The example tree structure 202 of FIG. 2B corresponds to the tree structure of the margins and unions of the example marginal and union data 200. The tree structure 202 corresponds to a tree linkage of margins and unions based on the unions identified in the example margin and union data 200. Alternatively, other tree structures can be generated based on different combination of margins and/or unions (e.g., so long as each node has no more than one parent). The example union population reach determiner 120 generates a tree structure association or tree associations corresponding to the example tree structure 202 by tagging the margins and/or unions with corresponding node numbers, ancestors, and/or descendants. For example, the union population reach determiner 120 may tag the AB union with a node number (e.g., 5) and may tag the AB node as having a parent union of ABCD (e.g., node 7) and children margins A and B (e.g., nodes 1 and 2). In this manner, commercial solvers of the union population reach determiner 120 can utilize the values of the example margin and union data 200 for the corresponding variables of the above Equations 1-7.

The example tree structure conversion 204 of FIG. 2C illustrates a removal of a node (e.g., node 6 corresponding to union CD) from the example tree structure 202, thereby resulting in the example node removal tree structure 206. The example tree structure 202 corresponds to the total audience (e.g., AUD(T) of Equations 1 and 6) while the example node removal tree structure 206 corresponds to the total audience if node 6 (e.g., union CD) was removed (e.g., AUD(T\6) of Equations 1 and 6). The example union population reach determiner 120 can compute AUD(T/6) using a first technique by utilizing the example node removal tree structure 206 itself and utilize the above Equation 3 or using a second technique by computing s values of only the ancestors that are impacted (e.g., using Equation 5), thereby conserving memory and time by eliminating computations corresponding to the first technique. The example union population reach determiner 120 can determine the population audience of union CD by leveraging the fact that the audience of CD is equivalent to the audience of ABCD minus the audience of ABCD if the CD union is removed, as shown in the example node removal tree structure 206.

Figure 3:
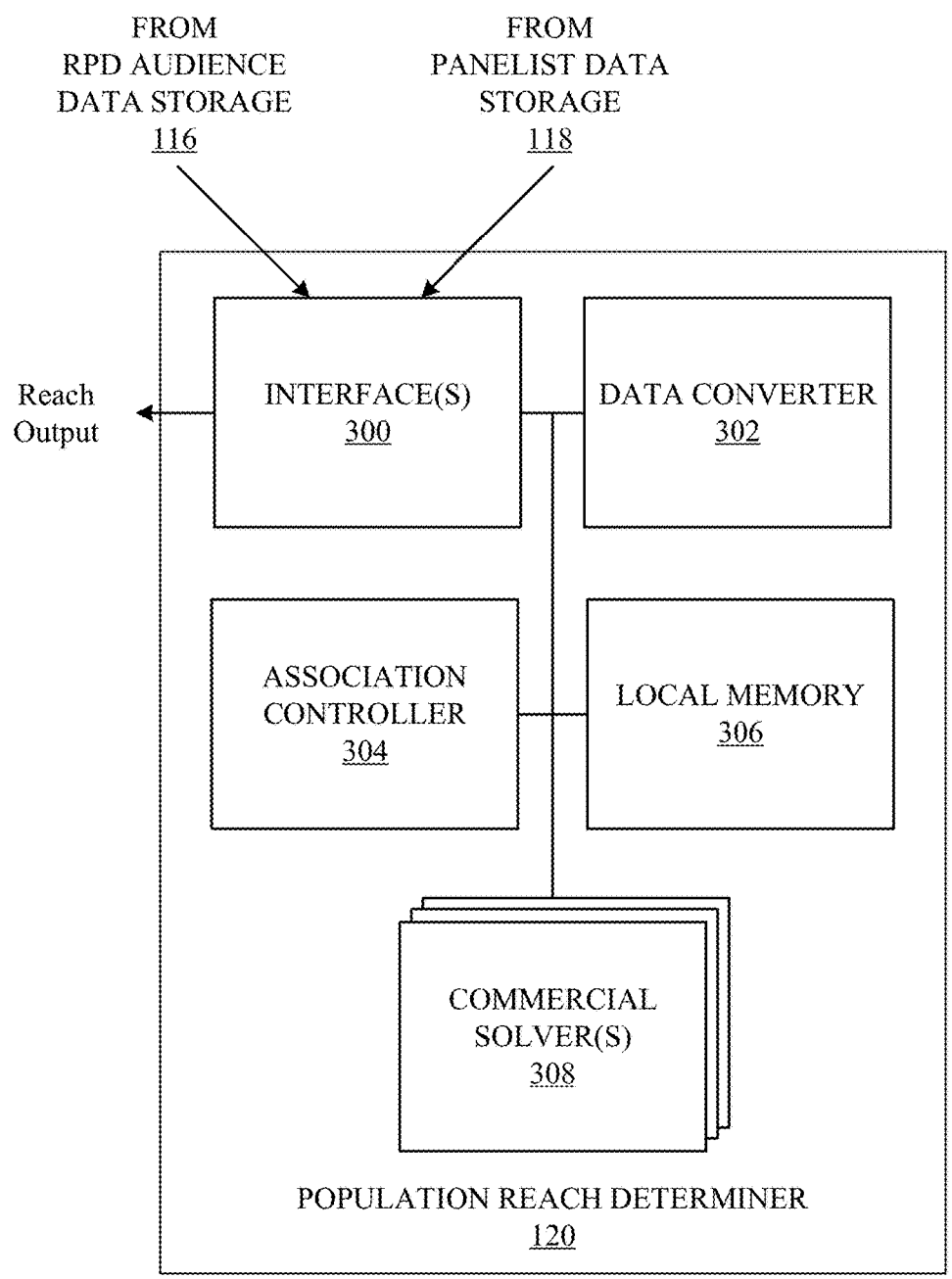
FIG. 3 is a block diagram of an example implementation of the example union population reach determiner of FIG. 1.

FIG. 3 is a block diagram of an example implementation of the example union population reach determiner 120 of FIG. 1 to determine population reach for given media based on unions of marginal ratings data. The example union population reach determiner 120 includes an example interface(s) 300, an example data converter 302, an example association controller 304, an example local memory 306, and an example commercial solver(s) 308. Although the example union population reach determiner 120 is described in conjunction with return path data, the example union population reach determiner 120 may determine reach based on information provided by any device that is capable of inputting audience marginal ratings, population marginal ratings, audience reach from the unions, and universe estimates. For example, the example union population reach determiner 120 may determine one or more reaches of from different programs, store visits for different stores, website visits, etc.

The example interface(s) 300 of FIG. 3 receives recorded audience (e.g., panelist) marginal ratings corresponding to media for two or more marginals (e.g., quarter hours), population audience marginal ratings corresponding to the media for the two or more marginals, total recorded audience reach for the two or more marginal ratings, and/or a universe estimate of users. In some examples, the interface(s) 300 receives the recorded audience (e.g., panelist) marginal data and the data converter 302 uses the recorded audience marginal data to determine the total recorded audience reach by deduplicating the panelists in both margins and/or unions of a union. In some examples, the interface(s) 300 receives recorded audience totals and population audience totals for predetermined margins and the data converter 302 converts the totals to percentages based on the respective total audience populations. The marginals may be broken up into quarter hours. For example, the recorded and/or population audience marginal ratings may correspond to four quarter hour marginals of an hour media program. However, the marginals may be broken up into any increments of time. Additionally, the example interface(s) 300 may output an estimated population reach (e.g., a deduplicated population audience total) for one or more unions to another device/system and/or as a report to a user.

The example data converter 302 of FIG. 3 processes the return path data from the RPD audience data storage 116 and/or the meter data from panelist data storage 118. The example data converter 302 selects one or more unions to analyze (e.g., to determine population reach(es)). The data converter 302 may be structured to select preset union(s) and/or may receive instructions from a user and/or a manufacturer corresponding to one or more union(s) to analyze. For example, in the example described in conjunction with FIG. 2A, the data converter 302 selects unions AB, CD, and ABCD from the margins A, B, C, and D. Alternatively, different unions based on different margins may be used so long as each union and/or margin only has one parent. Using the above example, the data converter 302 obtains return path data from the RPD audience data storage 116 via the interface(s) 300 corresponding to the margins A, B, C, and D. If the return path data stored in the RPD audience data storage 116 corresponds to audience (e.g., exposed to the media) population totals of the margins, the data converter 302 converts the audience population totals of the margins by dividing the audience population totals with the universe estimate (e.g., the total population) to generate an audience population percentage for the margins. Additionally, the data converter 302 obtains meter data from the panelist data storage 118 corresponding to the margins (e.g., A, B, C, D). If the panelist data storage 118 stores deduplicated panelist data for the determined unions, the data converter 302 obtains the meter data from the panelist data storage 118 corresponding to the determined unions (e.g., AB, CD, ABCD). If the panelist data storage 118 does not store deduplicated panelist data for the determined unions, the data converter 302 obtains the meter data from the panelist data storage 118 corresponding to the margins (e.g., A, B, C, and D), and processes the meter data to determine duplicate panel members included in both margins of a union and removes the duplicates from the sum of the totals of the margins, thereby generating a deduplicated panelist total for the union. Additionally, the data converter 302 converts the panelist audience totals of the margins and/or unions by dividing the panelist count audience totals with the panelist universe estimate (e.g., the total number of panelists) to generate a panelist audience percentage for the margins and/or unions.

The example association controller 304 of FIG. 3 generates the tree structure association based on the margins and selected unions. For example, using the unions and margins of the example of FIG. 2A, the association controller 304 tags each margin and union with (i) a number or other identifier and (ii) with corresponding ancestors and/or descendants. For example, the association controller 304 tags the AB union (e.g., node of the tree structure 202 of FIG. 2B) with a node number/identifier (e.g., 5) and tags the AB node/union as having a parent union of ABCD (e.g., node 7) and children margins A and B (e.g., nodes 1 and 2). The association controller 304 stores the tags in conjunction with the panelist identifiers and/or population margin and/or union percentages in the example local memory 306. In this manner, the commercial solver(s) 308 can solve a system of equations using the tagged panelist identifier and/or population margin and/or union percentages stored in the example local memory 306.

The example commercial solver(s) 308 of FIG. 3 are optimization software packet(s) that solve(s) one or more system of equations using the tagged panelist identifier and/or population margin and/or union percentages stored in the example local memory 306 to estimate the population reach of one or more union(s) of the margins. For example, the commercial solver(s) 308 may be a CPLEX optimizer, a GNU linear programming kit (GLPK), a Gurobi Optimizer, a solving constraint integer program, and/or any type of mixed integer programming optimizer. As described above, the commercial solver(s) 308 execute(s) three tasks (e.g., corresponding to solving for parameters in a system of equations) to estimate the population reach(es). The first task results in parameters of the panel, the second task results in parameters of the population, and the third task determines the one or more population reaches based on the parameters of the first task and the second task. For example, the commercial solver(s) 308 solve(s) the system of equations using the above Equation 6 and Equation 7 with an iterative process utilizing the tagged panelist union and margin data to solve for Lagrange multipliers (e.g., $\lambda$s) that satisfy the system of Equations 6 and 7. Based on Equation 6, the example commercial solver(s) 308 need to determine AUD $(T\setminus\{i\})$ for all nodes i. Because removing node i only affects ancestors of i, the example commercial solver(s) 308 performs parallel computations with a processor to solve for the λs corresponding to AUD(T\{i}) in parallel at each height starting at the lowest height (e.g., the margin height in parallel first, the parent height in parallel second, the grandparent height in parallel third, etc.). For example, the commercial solver(s) 308 can solve for the λs in parallel by performing computations with a processor (e.g., concurrently processing threads in a multi-threading processor, utilizing multiple cores of a multiple ore processor in parallel, utilizing a multiple processor system in parallel, etc.). Completion of the first task results in a set of λs, each corresponding to nodes of the tree structure. Once the first task is complete, the example commercial solver(s) 308 perform(s) a second task in which a first subset of the λs (e.g., $\lambda_o$–$\lambda_M$) corresponding to known census data (e.g., the margins in the example of FIG. 2A) of the tree structure association are discarded and a second subset of the λs (e.g., $\lambda_{M+1}$–$\lambda_N$) corresponding to unknown census data (e.g., the unions in the example of FIG. 2A) of the tree structure association are kept. In response to discarding the first subset of λs, the example commercial solver(s) 308 solve(s) the system corresponding to Equations 6 and 7 using the census data (e.g., in parallel at the height level), the unknown variable (e.g., $\lambda_o$–$\lambda_M$), and the known values of the first task (e.g., $\lambda_{M+1}$–$\lambda_N$), thereby resulting in a set of second task-based Lagrange multipliers λŝ based on both the panelist data and the census data. Using the example of FIG. 2A, the commercial solver(s) 308 discard the subset of λs that correspond to nodes 1, 2, 3, and 4 (e.g., margins A, B, C, and D) and keeps the subset of λs that correspond to nodes 5, 6, and 7 (e.g., unions AB, CD, and ABCD). After the discarding of the corresponding λs, the example commercial solver(s) 308 solve(s) the system of Equations based on Equations 6 and 7 using the maintained λs and the census data, thereby resulting in a set of second task-based Lagrange multipliers λŝ (e.g., including the maintained λs and additional λs solved during the second task) based on both the panelist data and the census data. Once the second task is complete, the example commercial solver(s) 308 performs a third task using the set of second task-based Lagrange multipliers λŝ in conjunction with the above Equation 8 to determine the population reach estimate(s) for one or more union(s).

While an example manner of implementing the example population reach determiner 120 of FIG. 1 is illustrated in FIG. 3, one or more of the elements, processes and/or devices illustrated in FIG. 3 may be combined, divided, re-arranged, omitted, eliminated and/or implemented in any other way. Further, the example interface(s) 300, the example data converter 302, the example association 304, the example local memory 306, the example commercial solver(s) 308, and/or, more generally, the example population reach determiner 120 of FIG. 3 may be implemented by hardware, software, firmware and/or any combination of hardware, software and/or firmware. Thus, for example, any of the example interface(s) 300, the example data converter 302, the example association 304, the example local memory 306, the example commercial solver(s) 308, and/or, more generally, the example population reach determiner 120 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface(s) 300, the example data converter 302, the example association 304, the example local memory 306, the example commercial solver(s) 308, and/or, more generally, the example population reach determiner 120 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example population reach determiner 120 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example population reach determiner 120 of FIG. 1 are shown in FIGS. 4-7. The machine readable instructions may be one or more executable programs or portion(s) of an executable program for execution by a computer processor such as the processor 812 shown in the example processor platform 800 discussed below in connection with FIG. 8. The program(s) may be embodied in software stored on a non-transitory computer readable storage medium such as a CD-ROM, a floppy disk, a hard drive, a DVD, a Blu-ray disk, or a memory associated with the processor 812, but the entireties of the program(s) and/or parts thereof could alternatively be executed by a device other than the processor 812 and/or embodied in firmware or dedicated hardware. Further, although the example program(s) is/are described with reference to the flowcharts illustrated in FIGS. 4-7, many other methods of implementing the example population reach determiner 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 4-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 4:
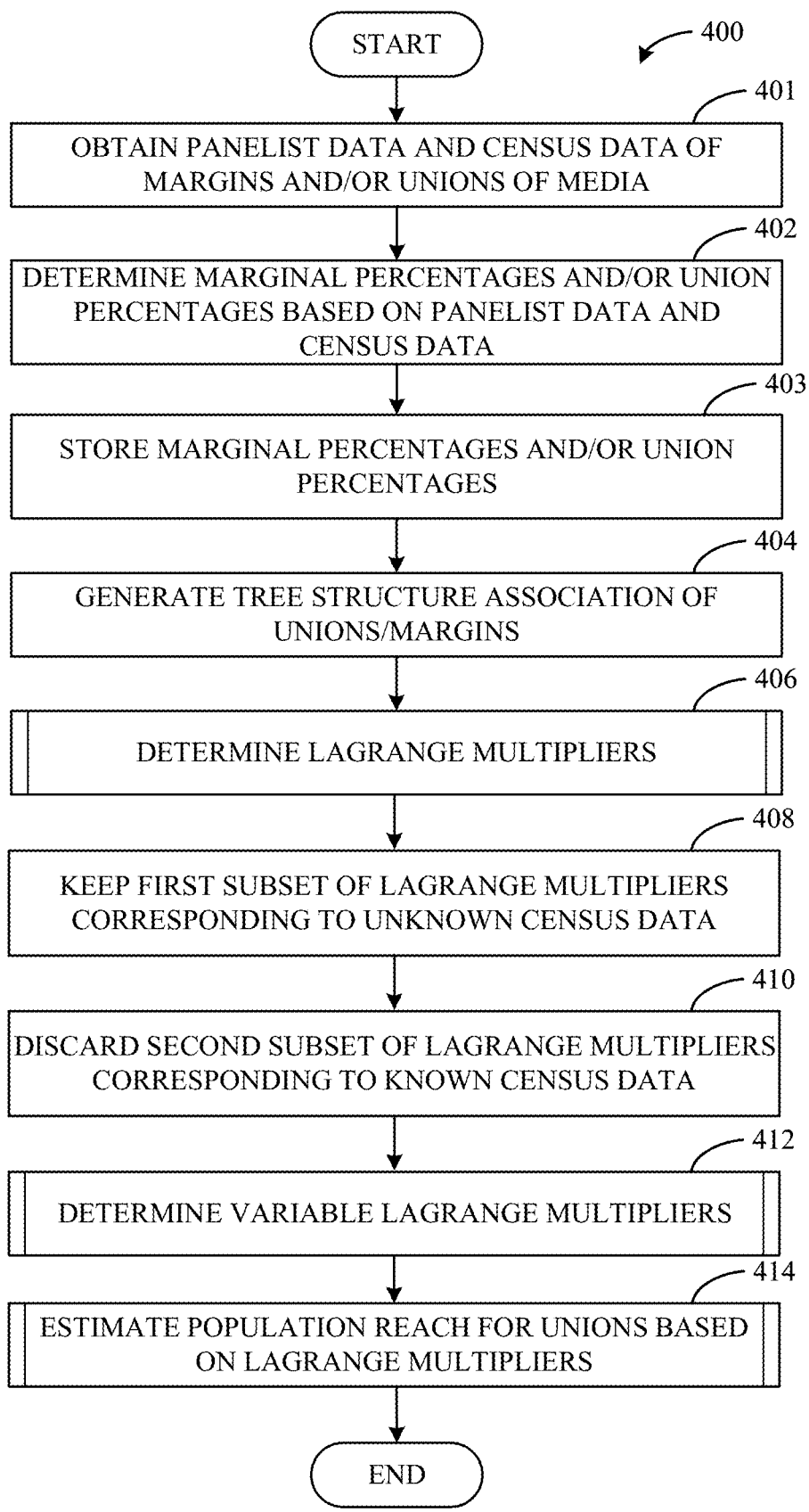
FIGS. 4-7 are flowcharts illustrating example machine readable instructions that may be executed to implement the example union population reach determiner of FIGS. 1 and/or 3.

FIG. 4 is an example flowchart 400 representative of example machine readable instructions that may be executed by the example union population reach determiner 120 of FIGS. 1 and/or 3 to generate respective population reach estimates for various unions. The example flowchart 400 is described in conjunction with the example marginal and union data 200 of FIG. 2A. However, the example flowchart 400 may be implemented in conjunction with any panelist data, census data, margins, and/or unions.

At block 401, the example interface(s) 300 (FIG. 3) obtains panelist data and census data of the margins and/or unions of media. In some examples, the association controller 304 (FIG. 3) instructs the interface(s) 300 to access the databases 116, 118 of FIG. 1 to obtain particular marginal and/or union data based on predefined margins and/or unions (e.g., the predefined margins and/or unions based on user and/or a manufacturer preferences). Using the example of FIG. 2A, the interface(s) 300 obtains census and/or panelist data from the example RPD audience data storage 116 corresponding to particular media (e.g., a television show) at margins A, B, C, and D and obtains panelist data from the example panelist data storage 118 corresponding to the particular media at margins A, B, C, and D and/or unions AB, BD, and ABCD (if available).

At block 402, the example data converter 302 (FIG. 3) processes the panelist data and the census data of the margins and/or unions of the media to determine the panelist margin and union percentages and the population margin percentages, as represented in the example marginal and union data 200 of FIG. 2A. As described above in conjunction with FIG. 3, the data converter 302 may convert marginal and/or union totals to marginal percentages (e.g., by dividing the totals by respective universe estimates) and/or may determine union percentages by deduplicating duplicate panelist counts in a union. At block 403, the example local memory 306 (FIG. 3) stores the marginal percentages and/or union percentages based on the panelist data and census data. At block 404, the example association controller 304 generates a tree structure association of the unions/margins. As described above in conjunction with FIG. 3, the example association controller 304 (FIG. 3) generates a tree structure association by tagging the margins and unions with numbers and/or identifiers and tagging each node with corresponding ancestor and/or descendant information. The tree structure association information is stored in the example local memory 306.

At block 406, the example commercial solver(s) 308 (FIG. 3) determines(s) Lagrange multipliers based on panel parameters. For example, the commercial solver(s) 308 solve(s) for the Lagrange multipliers ($\lambda_0 = -1.20397$, $\lambda_1 = -1.09861$, $\lambda_2 = 0$, $\lambda_3 = -0.510826$, $\lambda_4 = 0$, $\lambda_5 = -2.0149$, $\lambda_6 = -1.19392$, $\lambda_7 = 0.81093$) which corresponds to the solution for all panelist constraints (e.g., AUD(A)=0.1, AUD(B)=0.2, AUD(C)=0.3, AUD(D)=0.4, AUD(AB)=0.25, AUD(CD)=0.55, AUD(ABCD)=0.7) using Equations 6 and 7 based on the panelist data and tree structure association data stored in the local memory 306 (FIG. 3). An example process that may be used to implement block 406 is described below in conjunction with FIG. 5. For example, the commercial solver(s) 308 determine(s) that to satisfy the system of equations represented by Equations 6 and 7, $\lambda_0 = -1.20397$, $\lambda_1 = -1.09861$, $\lambda_2 = 0$, $\lambda_3 = -0.510826$, $\lambda_4 = 0$, $\lambda_5 = -2.0149$, $\lambda_6=-1.19392$, and $\lambda_7=0.81093$, where $\lambda_0$ corresponds to the normalized constraint, $\lambda_1$ corresponds to the margin A (e.g., corresponding to node 1), $\lambda_2$ corresponds to the margin B (e.g., corresponding to node 2), . . . , and $\lambda_7$ corresponds to the union ABCD (e.g., corresponding to node 7). Additionally, because $z_i=e^{\lambda_i}$, the commercial solver(s) 308 determine(s) that $z_0=0.3$, $z_1=0.333$, $z_2=1$, $z_3=0.6$, $z_4=1$, $z_5=0.133$, $z_6=0.303$, $z_7=2.25$.

At block 408, the example commercial solver(s) 308 keep(s) values of a first subset of the Lagrange multipliers corresponding to the unknown census data (e.g., $\lambda_5=-2.0149$, $\lambda_6=-1.19392$, $\lambda_7=0.81093$, corresponding to the union nodes 5, 6, and 7 of the tree structure 202 of FIG. 2B). At block 410, the example commercial solver(s) 308 discard(s) a second subset of the Lagrange multipliers corresponding to known census data (e.g., the margins in the example of FIG. 2A). For example, because the census data is known for margin A, B, C, D and the audience total (e.g., corresponding to nodes 0, 1, 2, 3, and 4), the example commercial solver(s) 308 discard(s) the corresponding Lagrange multipliers, thereby designating the Lagrange multiplier variables $\lambda_0$, $\lambda_1$, $\lambda_2$, $\lambda_3$, and $\lambda_4$ as empty or ready to be determined at a subsequent time.

At block 412, the example commercial solver(s) 308 determine(s) the variable Lagrange multipliers (e.g., $\lambda_0$, $\lambda_1$, $\lambda_2$, $\lambda_3$, and $\lambda_4$) based on census parameters. For example, the commercial solver(s) solve(s) for the Lagrange multipliers (e.g., $\lambda_0$, $\lambda_1$, $\lambda_2$, $\lambda_3$, and $\lambda_4$) using the system of equations corresponding to Equations 6 and 7 based on the population parameters (e.g., AUD(A)=0.2, AUD(B)=0.4, AUD(C)=0.6, AUD(D)=0.8) and the first subset of the Lagrange multipliers (e.g., $\lambda_5=-2.0149$, $\lambda_6=-1.19392$, $\lambda_7=0.81093$), thereby resulting in second task-based Lagrange multipliers $\lambda\hat{s}$ (e.g., the values of $\lambda_0$, $\lambda_1$, $\lambda_2$, $\lambda_3$, and $\lambda_4$ from block 412 and the values of $\lambda_5$, $\lambda_6$, and $\lambda_7$ from block 406) as further described below in conjunction with FIG. 6. For example, using the example data of FIG. 2A, the commercial solver(s) 308 determine that $\lambda_{\hat{0}}=-3.17489$, $\lambda_{\hat{1}}=-0.498689$, $\lambda_{\hat{2}}=1.12924$, $\lambda_{\hat{3}}=-0.574063$, $\lambda_{\hat{4}}=1.7578$, $\lambda_{\hat{5}}=-2.0149$, $\lambda_{\hat{6}}=-1.19392$, and $\lambda_{\hat{7}}=0.81093$. Additionally, because $z_i=e^{\lambda_i}$, the commercial solver(s) 308 determine(s) that $\hat{z}_0=0.0417986$, $\hat{z}_1=0.607326$, $\hat{z}_2=3.09329$, $\hat{z}_3=1.77547$, $z_4=5.79965$, $\hat{z}_5=0.1333$, $\hat{z}_6=0.303$, $\hat{z}_7=2.25$. At block 414, the example commercial solver(s) 308 estimate the population reach(es) for one or more of the unions (e.g., AB, CD, and/or ABCD) based on the Lagrange multipliers (e.g., and/or the example ẑ values) determined at blocks 406 and 412 using the above Equation 8, as further described below in conjunction with FIG. 7. As a result of block 414, the example commercial solver(s) 308 determines that the population reach percentage for the AB union is 0.44886 of the universe estimate of audience members, the population reach of the CD union is 0.88824 of the universe estimate of the audience members, and the population reach of the ABCD union is 0.958201 of the universe estimate of the audience members.

Figure 5:
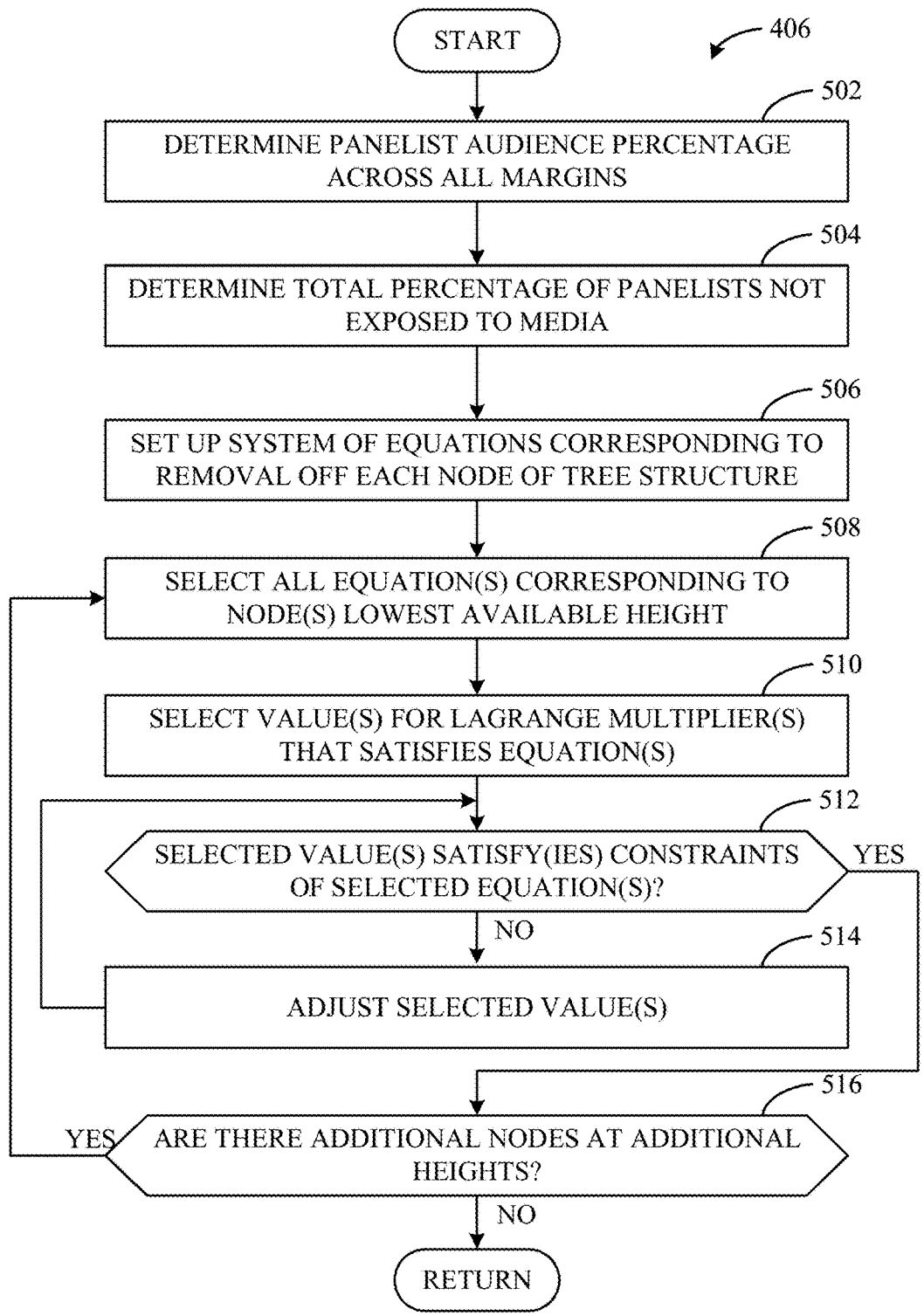

FIG. 5 is an example flowchart 406 representative of example machine readable instructions that may be executed by the example union population reach determiner 120 of FIGS. 1 and/or 3 to solve for Lagrange multipliers based on the panel parameters (e.g., AUD(A)=0.1, AUD(B)=0.2, AUD(C)=0.3, AUD(D)=0.4, AUD(AB)=0.25, AUD(CD)=0.55, AUD(ABCD)=0.7). The instructions of FIG. 5 may be used to implement block 406 of FIG. 4. The example flowchart 406 is described in conjunction with the example marginal and union data 200 of FIG. 2A. However, the example flowchart 406 may be implemented in conjunction with any panelist data, census data, margins, and/or unions.

At block 502, the example commercial solver(s) 308 (FIG. 3) determine(s) the panelist audience percentage across all margins (e.g., AUD(T) of Equation 6). Using the example of FIG. 2A, the commercial solver(s) 308 determine(s) that the panelist audience across all margins corresponds to 0.7 or 70% (e.g., the percentage corresponding to the union ABCD). At block 504, the example commercial solver(s) 308 determine(s) the total percentage of panelists not exposed to media (e.g., $z_0$ of Equation 7). For example, the commercial solver(s) 308 determine(s) that the total percentage of panelists not exposed to media is 0.3 (e.g., $z_0+0.7=1.0$, from Equation 7). Accordingly, the commercial solver(s) 308 determine(s) that $\lambda_0=-1.20397$, because $z_i=e^{\lambda_i}$.

At block 506, the example commercial solver(s) 308 set(s) up a system of equations based on Equation 6 corresponding to removal off each node of the tree structure association using the panelist data. For example, the commercial solver(s) 308 set(s) up a system of equations including $0.7-\mathrm{AUD}(T\backslash 1)=0.1$ for node 1 (e.g., margin A), $0.7-\mathrm{AUD}(T\backslash 2)=0.2$ for node 2 (e.g., margin B), . . . , and $0.7-\mathrm{AUD}(T\backslash 6)=0.55$ for node 6 (e.g., union CD).

At block 510, the example commercial solver(s) 308 select(s) all equations corresponding to node(s) at the lowest available height (e.g., margins being the lowest height and the union corresponding to the total representing the highest height). As described above, because removing a node from the tree structure association only affects the ancestors of the node, the commercial solver(s) 308 performs parallel computations with a processor to can calculate the Lagrange multipliers at the same height in parallel without affecting the other nodes. For example, initially the commercial solver(s) select(s) the equations corresponding to the lowest level nodes (e.g., 1, 2, 3, and 4) corresponding to the margins A, B, C, and D (e.g., $0.7-\mathrm{AUD}(T\backslash 1)=0.1$, $0.7-\mathrm{AUD}(T\backslash 2)=0.2$, $0.7-\mathrm{AUD}(T\backslash 3)=0.3$, and $0.7-\mathrm{AUD}(T\backslash 4)=0.3$).

At block 510, the example commercial solver(s) 308 select(s) value(s) for the Lagrange multiplier(s) that satisfy(ies) the equations. As described above, each of the selected equations corresponds to Equation 4, which include variable(s) that can be identified using Equation 5. Because both Equation 4 and Equation 5 include z values and $z_i=e^{\lambda_i}$, the commercial solver(s) 308 can select a value for the Lagrange multipliers ($\lambda i$) that satisfies the selected equation(s). The example commercial solver(s) 308 determine if the selected value(s) satisfy(ies) the constraint(s) of the selected equation(s) (e.g., within a threshold amount of error) (block 512).

If the example commercial solver(s) 308 determine(s) that the selected value(s) do(es) not satisfy(ies) the constraint(s) of the selected equation(s) (block 512: NO), the commercial solver(s) 308 adjust(s) the selected value(s) of the Lagrange multipliers (block 514), and the control returns to block 512 until the selected value(s) do(es) satisfy the constraints (e.g., within the threshold amount of error). In this manner, the example commercial solver(s) 308 perform(s) parallel computations with a processor to determine the Lagrange multipliers in an iterative fashion in parallel. If the example commercial solver(s) 308 determine(s) that the selected value(s) do(es) satisfy the constraint(s) of the selected equation(s) (block 512: YES), the example commercial solver(s) 308 determine(s) if there are additional node(s) of the tree structure association at additional height(s) (block 516). For example, once the example commercial solver(s) 308 determine(s) the Lagrange multipliers for the margins A, B, C, D, the commercial solver(s) 308 determine(s) that there are additional nodes (e.g., AB and CD) at the next lowest height. If the commercial solver(s) 308 determine(s)

that there are additional node(s) at additional height(s) (block 516: YES), the control returns to block 508 to determine the Lagrange multipliers corresponding to the additional node(s). If the commercial solver(s) 308 determine(s) that there are not additional node(s) at additional height(s) (block 516: NO), the example process of FIG. 5 ends, and control returns to a calling function or process such as the example process of FIG. 4.

Figure 6:
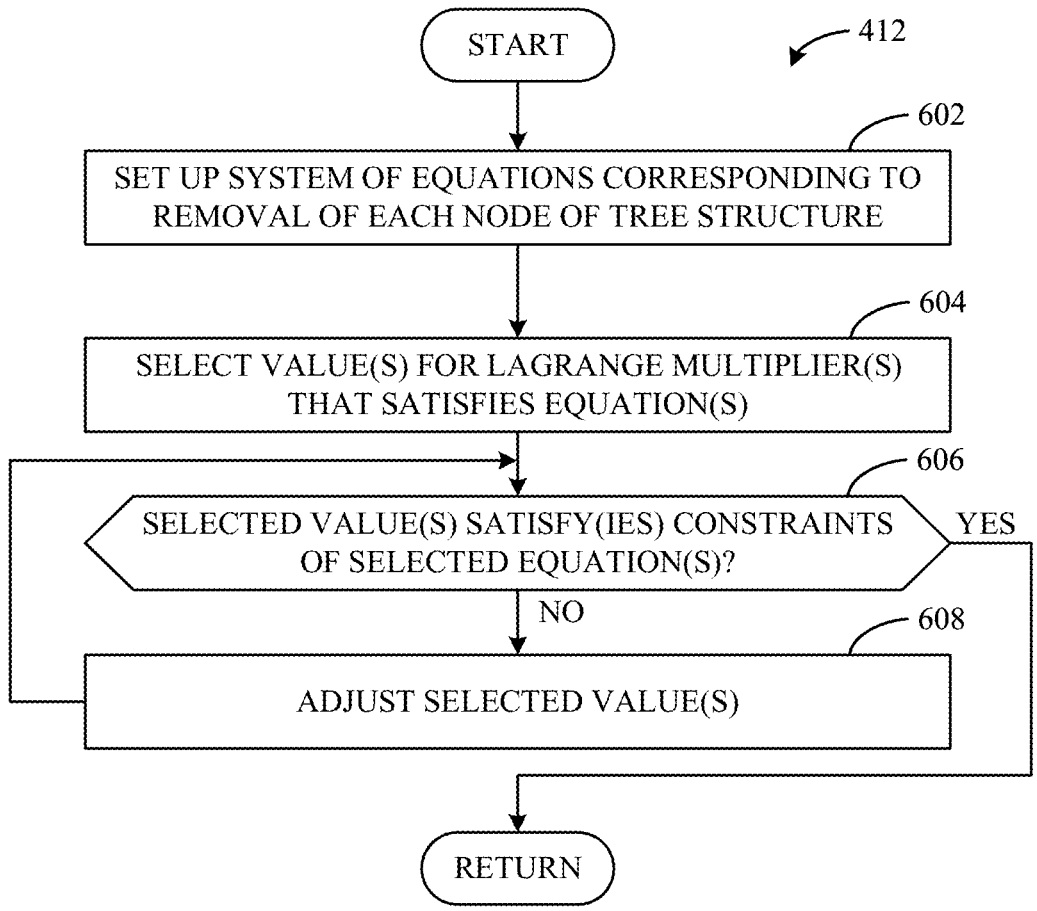

FIG. 6 is an example flowchart 412 representative of example machine readable instructions that may be executed by the example union population reach determiner 120 of FIGS. 1 and/or 3 to solve for the variable Lagrange multipliers based on population parameters (e.g., AUD(A)=0.2, AUD(B)=0.4, AUD(C)=0.6, AUD(D)=0.5) and the first subset of Lagrange multipliers (e.g., $\lambda_5=-2.0149$, $\lambda_6=-1.19392$, $\lambda_7=0.81093$) of block 408 of FIG. 4. The example instructions of FIG. 6 may be used to implement block 412 of FIG. 4. The example flowchart 412 is described in conjunction with the example marginal and union data 200 of FIG. 2A. However, the example flowchart 412 may be described in conjunction with any panelist data, census data, margins, and/or unions.

At block 602, the example commercial solver(s) 308 set(s) up a system of equations based on Equation 6 corresponding to removal of each node of the tree structure association. For example, the commercial solver(s) 308 use(s) the panelist data where the first subset Lagrange multipliers are used for the equations corresponding to union removals. For example, the commercial solver(s) 308 sets of a system of equations including AUD(T)−AUD(T\1)=0.2 for node 1 (e.g., margin A), AUD(T)−AUD(T\2)=0.4 for node 2 (e.g., margin B), . . . , and AUD(T)−AUD(T\6)=? for node 6 (e.g., union CD).

At block 604, the example commercial solver(s) 308 select(s) value(s) for the variable Lagrange multiplier(s) (e.g., $\lambda_0$, $\lambda_1$, $\lambda_2$, $\lambda_3$, and $\lambda_4$) that satisfies the equations while using the first subset of the Lagrange multiplier(s) (e.g., $\lambda_5=-2.0149$, $\lambda_6=-1.19392$, $\lambda_7=0.81093$). As described above, each of the selected equations corresponds to Equations 2 and 4, which includes a variable s and a variable $s^{(new)}$ that can be identified using equations 3 and 5, respectively. Because Equations 2-5 include z values and $z_i=e^{\lambda_i}$, the commercial solver(s) 308 can select a value for the variable Lagrange multipliers ($\lambda_1$) that satisfies the select equation(s). Once the commercial solver(s) 308 select(s) the value(s) of the variable Lagrange multipliers, the example commercial solver(s) 308 determine(s) if the selected value(s) satisfy(ies) the constraint(s) of the selected equation(s) (e.g., within a threshold amount of error) (block 606).

If the example commercial solver(s) 308 determine(s) that the selected value(s) do(es) not satisfy the constraint(s) of the selected equation(s) (block 606: NO), the commercial solver(s) 308 adjust(s) the selected value(s) of the variable Lagrange multipliers (block 608) and the control returns to block 512 until the selected value(s) do(es) satisfy the constraints (e.g., within the threshold amount of error). In this manner, the example commercial solver(s) 308 performs parallel computations with a processor to determine the variable Lagrange multipliers in an iterative fashion in parallel. If the example commercial solver(s) 308 determine(s) that the selected value(s) do(es) satisfy the constraint(s) of the selected equation(s) (block 606: YES), the example process of FIG. 6 ends and control returns to a calling function or process such as a process implemented by the flowchart of FIG. 6.

Figure 7:
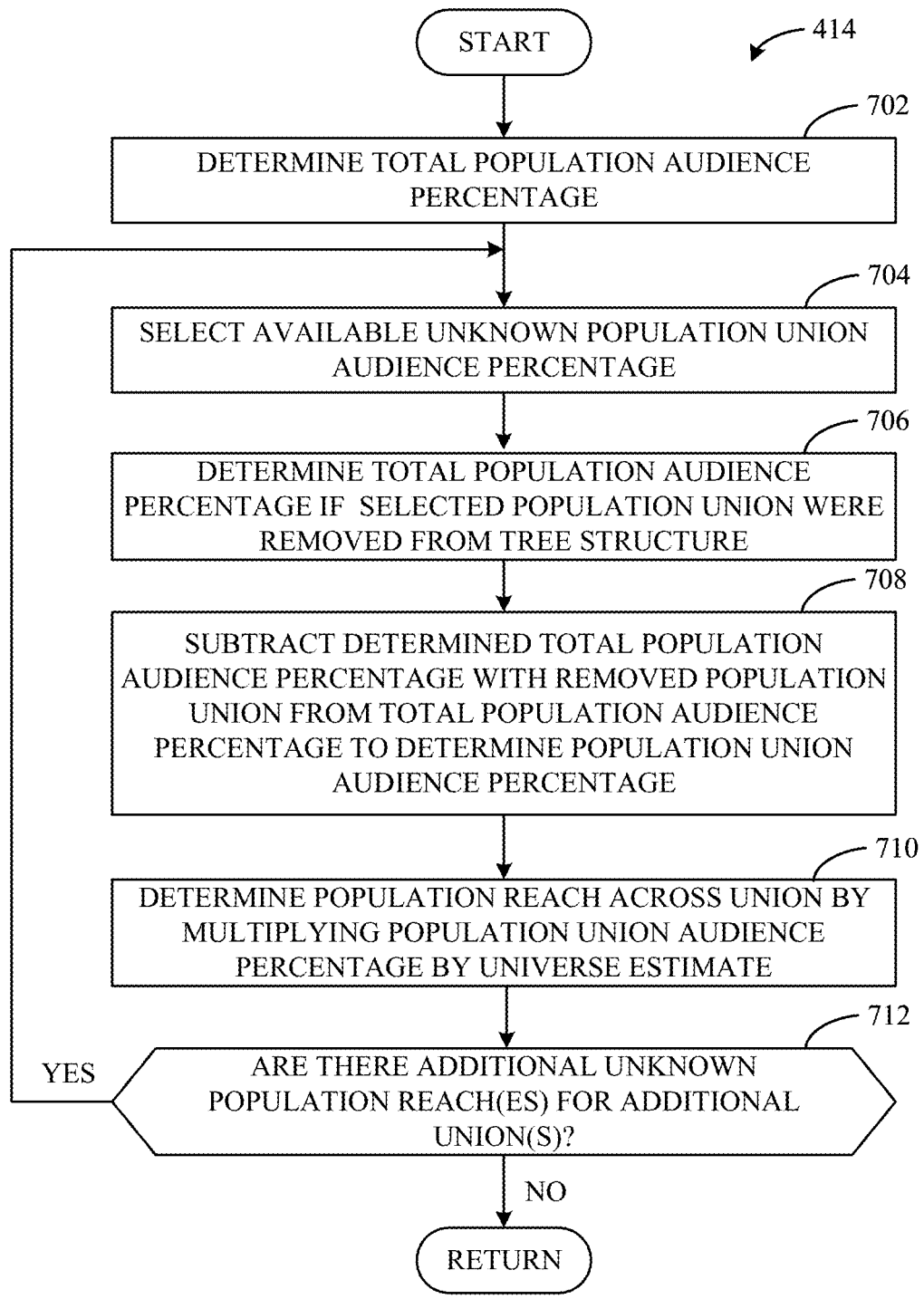

FIG. 7 is an example flowchart 414 representative of example machine readable instructions that may be executed by the example union population reach determiner 120 of FIGS. 1 and/or 3 to estimate population reach(es) for union(s) based on the determined Lagrange multipliers (e.g., $\lambda_0=-3.17489$, $\lambda_1=-0.498689$, $\lambda_2=1.12924$, $\lambda_3=-0.574063$, $\lambda_4=1.7578$, $\lambda_5=-2.0149$, $\lambda_6=-1.19392$, and $\lambda_7=0.81093$). The example instructions of FIG. 7 may be used to implement block 414 of FIG. 4. The example flowchart 414 is described in conjunction with the example marginal and union data 200 of FIG. 2A. However, the example flowchart 414 may be described in conjunction with any panelist data, census data, margins, and/or unions.

At block 702, the example commercial solver(s) 308 determine(s) the total population audience (e.g., AUD(T)). As described above in conjunction with Equation 2, AUD (T)=$z_0 z_N s_N$, where $z_0 z_N$ correspond to the Lagrange multipliers determined in block 412 and $s_N$ can be solved using Equation 3. Accordingly, the commercial solver(s) 308, using Equation 2, determine(s) that since N=7, $s_1=s_2=s_3=s_4=1$, $s_5=(1+s_1\hat{z}_1)(1+s_2\hat{z}_2)-1=5.57925$, and $s_6=(1+s_3\hat{z}_3)(1+s_3\hat{z}_3)-1=17.87222$. Accordingly, the example commercial solver(s) 308 determine(s) that $s_7=(1+s_5\hat{z}_5)(1+s_6\hat{z}_6)-1=10.1885552$. Thus, the example commercial solver(s) 308 determine(s) that AUG(T)=(0.418)(2.25) (10.188552)=0.9582.

At block 704, the example commercial solver(s) 308 select(s) an available unknown population union audience. For example, in the example of FIG. 2A, percentages corresponding to the AB, CD, and ABCD unions are unknown for the census data. Accordingly, the example commercial solver(s) 308 may select(s) the AB (e.g., corresponding to node 5 of the example tree structure 202 of FIG. 2A). At block 706, the example commercial solver(s) 308 determine(s) the total population audience percentage if the selected population union were removed from the tree structure association (e.g., AUD(T\5)). For example, using the above Equation 4, the example commercial solver(s) 308 determine(s) that AUD(T\5)=$z_0 z_7 s_7^{(new)}$. Because the z values are known (e.g., based on the determined Lagrange multipliers from blocks 406 and 414), to solve for AUD(T/ 5), the commercial solver(s) 308 utilize(s) Equation 5 to solve for $s_7^{(new)}$. For example, based on the tree structure association and Equation 5, $$s_7^{(new)} = \left(\frac{s_7+1}{1+s_5 z_5}\right) - 1.$$

Accordingly, the example commercial solver(s) 308 determine(s) that the $$s_7^{(new)} = \left(\frac{(10.188552)+1}{1+(5.57925)(0.1333)}\right) - 1 = 5.4158.$$

Thus, the commercial solver(s) 308 determine(s) that AUD (T\5)=(0.0417986)(2.25)(5.4158)=0.5093.

At block 708, the example commercial solver(s) 308 subtract(s) the determined total population audience with the removed population union from the total population audience to determine the population union audience percentage (e.g., corresponding to Equation 1). For example, the commercial solver(s) 308 determines the total deduplicated population audience percentage of union AB to be 0.4486 (e.g., 0.4486=0.9582-0.5093). At block 710, the example commercial solver(s) 308 determine(s) the population reach across the selected union by multiplying the population union audience percentage by the universe estimate. For example, if the universe estimate is 100,000 people, then the example commercial solver(s) 308 determine(s) the population reach for union AB to be 44,860 people. At block 712, the example commercial solver(s) 308 determine if there are additional unknown population union audiences to solve for. If the example commercial solvers) 308 determine that there are additional population reach(es) for additional union(s) to solve for (block 712: YES), the control returns to block 704 to determine an additional population reach for an additional union. If the example commercial solvers) 308 determine that there are not additional population reach(es) for additional union(s) to solve for (block 712: NO), the example process of FIG. 7 ends and control returns to a calling function or process such as the process implemented by FIG. 4.

Figure 8:
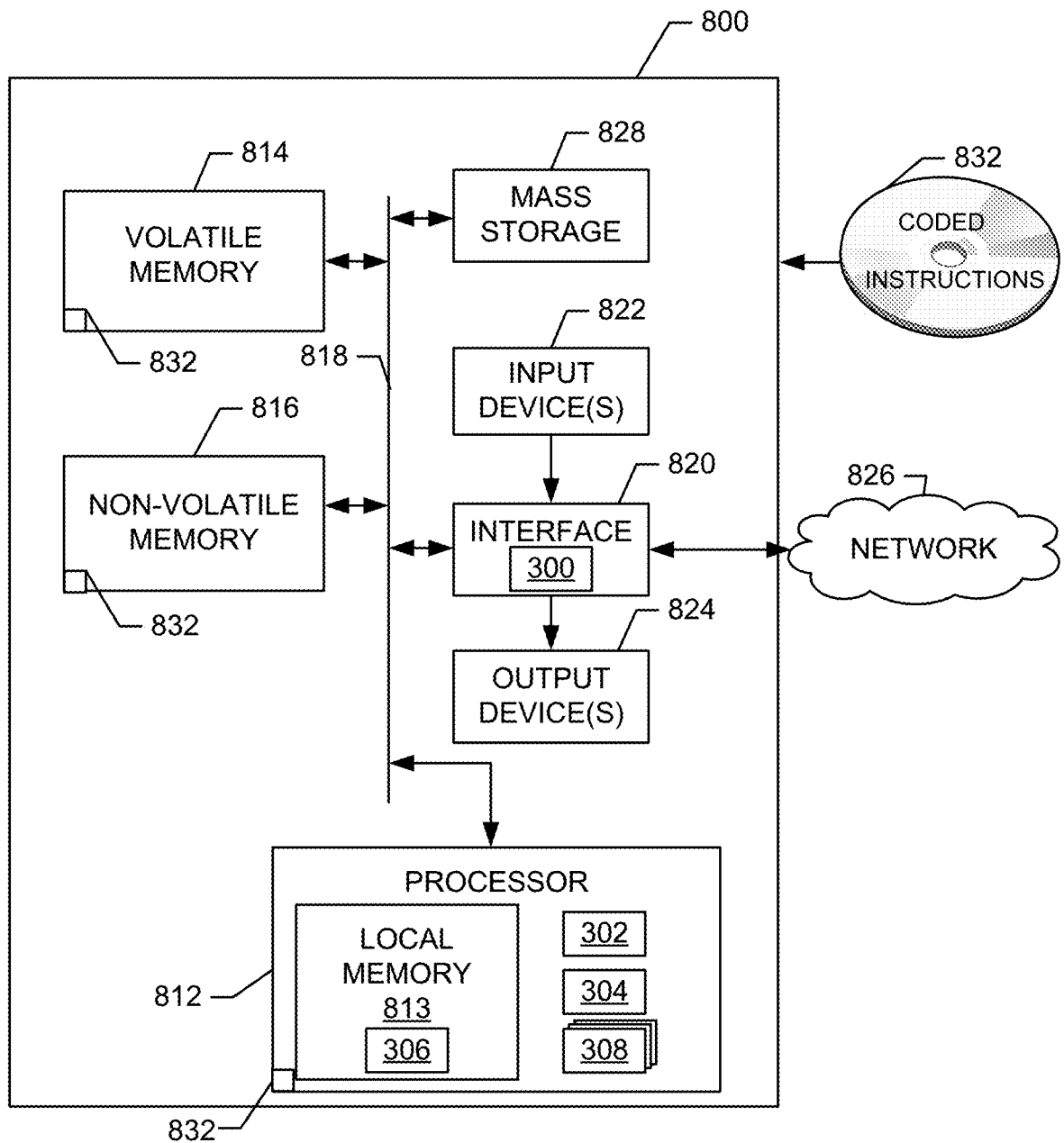
FIG. 8 is a block diagram of an example processing system structured to execute the example machine readable instructions of FIGS. 4-7 to implement the example union population reach determiner of FIGS. 1 and/or 3.

FIG. 8 is a block diagram of an example processor platform 800 structured to execute the instructions of FIGS. 4-7 to implement the population reach determiner 120 of FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the example data converter 302, the example association controller 304, and the example commercial solver(s) 308.

The processor 812 of the illustrated example includes a local memory 813 (e.g., a cache). In FIG. 8, the example local memory 813 implements the example local memory 306. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface. In the example of FIG. 8, the interface 820 implements the example interface(s) 300.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

Machine executable instructions 832 represented by FIGS. 4-7 may be stored in the mass storage device 828, in the volatile memory 814, in the non-volatile memory 816, and/or on a removable non-transitory computer readable storage medium such as a CD or DVD.

From the foregoing, it should be appreciated that the above disclosed methods, apparatus, and articles of manufacture estimate population reach from marginal ratings. Example disclosed herein determine the reach analytically using the above Equations 1-8. Traditional techniques for determining reach across various unions include determining the reach numerically. However, such traditional techniques are unsolvable for a large number of marginals dues to memory and/or processing constraints. Examples disclosed herein alleviate the problems associated with such traditional techniques by demining the reach analytically (e.g., via solving the disclosed Equations 2-8 using a population reach union estimates) in a manner that facilitates parallel processing. The parallel processing results in a faster more efficient calculation. In this manner, the estimations of reach can be determined in a faster, more efficient manner that requires less memory than traditional numerical techniques. Using examples disclosed herein reach can be determined from a nearly infinite number of instances and/or unions of media exposure based on the marginal media exposure data.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A system comprising:
   memory;
   computer readable instructions; and
   programmable circuitry to be programmed by the computer readable instructions to:
   solve first equations corresponding to a tree association to determine first multipliers corresponding to a total number of panelists that accessed (a) first media, (b) second media, and (c) the first media or the second media, the tree association corresponding to a union of the first and second media;
   determine second multipliers corresponding to a total audience that accessed the first media and the second media, the second multipliers based on solving second equations corresponding to the tree association, the second equations including a subset of the first multipliers; and
   determine an estimate for a population reach of the union based on the second multipliers.

2. The system of claim 1, further including an association controller to generate the tree association by:
   tagging the first media with a first identifier, the second media with a second identifier, and a third media with a third identifier; and
   tagging the first media, the second media, and the union with at least one of corresponding descendants or corresponding ancestors.

3. The system of claim 1, wherein the first equations include a third equation corresponding to the first media, a fourth equation corresponding to the second media, and a fifth equation corresponding to the union.

4. The system of claim 3, wherein the programmable circuitry is to solve for ones of the first multipliers based on the third equation and ones of the second multipliers based on the fourth equation in parallel.

5. The system of claim 1, wherein the programmable circuitry is to solve the first equations iteratively.

6. The system of claim 1, wherein the programmable circuitry is to:
   discard ones of the first multipliers corresponding to the first media and the second media;
   keep at least one of the first multipliers, the at least one of the first multipliers corresponding to the union; and
   include the at least one of the first multipliers in the second equations.

7. The system of claim 1, wherein the union is a first union, the tree association corresponds to a second union of third and fourth media, the total audience corresponds to a third union of the first and second unions.

8. The system of claim 7, wherein the programmable circuitry is to determine the estimate of the population reach of the first union based on a difference between a first percentage of the total audience and a second percentage of the total audience if the first union is removed from the tree association.

9. The system of claim 1, further including:
   a network interface to collect meter data and known census data via a network communication, the meter data including first data related to the total number of the panelists that accessed (a) the first media, (b) the second media, and (c) the first media or the second media, the known census data including second data related to the total audience that accessed the first media and the second media, the known census data missing unknown census data related to a second total audience for the union corresponding to the first and second media; and
   at least one storage to store the meter data and the known census data, the programmable circuitry to access the meter data and the known census data to estimate the missing unknown census data, the unknown census data being the estimate for the population reach of the union.

10. A non-transitory computer readable storage medium comprising instructions to program programmable circuitry to at least:
    solve first equations corresponding to a tree association to determine first multipliers corresponding to a total number of panelists that accessed (a) first media, (b) second media, and (c) the first media or the second media by solving first equations corresponding to a tree association, the tree association corresponding to a union of the first media or the second media;
    determine second multipliers corresponding to a total audience that accessed the first media and the second media, the second multipliers based on solving second equations corresponding to the tree association, the second equations including a subset of the first multipliers; and
    determine an estimate for a population reach of the union based on the second multipliers.

11. The computer readable storage medium of claim 10, wherein the instructions are to program the programmable circuitry to generate the tree association by:
    tagging the first media with a first identifier, the second media with a second identifier, and a third media with a third identifier; and
    tagging the first media, the second media, and the union with at least one of corresponding descendants or corresponding ancestors.

12. The computer readable storage medium of claim 10, wherein the first equations include a third equation corresponding to the first media, a fourth equation corresponding to the second media, and a fifth equation corresponding to the union.

13. The computer readable storage medium of claim 12, wherein the instructions are to program the programmable circuitry to solve for ones of the first multipliers based on the third equation and ones of the second multipliers based on the fourth equation in parallel.

14. The computer readable storage medium of claim 10, wherein the instructions are to program the programmable circuitry to solve the first equations iteratively.

15. The computer readable storage medium of claim 10, wherein the instructions are to program the programmable circuitry to:
    discard ones of the first multipliers corresponding to the first media and the second media;
    keep at least one of the first multipliers, the at least one of the first multipliers corresponding to the union; and
    include the at least one of the first multipliers in the second equations.

16. The computer readable storage medium of claim 10, wherein the union is a first union, the tree association corresponds to a second union of third and fourth media, the total audience corresponds to a third union of the first and second unions.

17. The computer readable storage medium of claim 16, wherein the instructions are to program the programmable circuitry to determine the estimate of the population reach of the first union based on a difference between a first percentage of the total audience and a second percentage of the total audience if the first union is removed from the tree association.

18. The computer readable storage medium of claim 10, wherein the instructions are to program the programmable circuitry to:
collect meter data and known census data via a network communication, the meter data including first data related to the total number of the panelists that accessed (a) the first media, (b) the second media, and (c) the first media or the second media, the known census data including second data related to the total audience that accessed the first media and the second media, the known census data missing unknown census data related to a second total audience for the union corresponding to the first and second media;
cause storage of the meter data and the known census data; and
access the meter data and the known census data to estimate the missing unknown census data, the unknown census data being the estimate for the population reach of the union.

19. A method comprising:
solving, by executing an instruction with processor circuitry, solve first equations corresponding to a tree association to determine solve first equations corresponding to a tree association to first multipliers corresponding to a total number of panelists that accessed (a) first media, (b) second media, and (c) the first media or the second media by solving first equations corresponding to a tree association, the tree association corresponding to a union of the first and second media;
determining, by executing an instruction with the processor circuitry, second multipliers corresponding to a total audience that accessed the first media and the second media, the second multipliers based on solving second equations corresponding to the tree association, the second equations including a subset of the first multipliers; and
determining, by executing an instruction with the processor circuitry, an estimate for a population reach of the union based on the second multipliers.

20. The method of claim 19, further including generating the tree association includes:
tagging the first media with a first identifier, the second media with a second identifier, and a third media with a third identifier; and
tagging the first media, the second media, and the union with at least one of corresponding descendants or corresponding ancestors.

21. The method of claim 19, wherein the first equations include a third equation corresponding to the first media, a fourth equation corresponding to the second media, and a fifth equation corresponding to the union.

22. The method of claim 21, further including solving for ones of the first multipliers based on the third equation and ones of the second multipliers based on the fourth equation in parallel.

23. The method of claim 19, further including solving the first equations iteratively.

24. The method of claim 19, further including:
discarding one of the first multipliers corresponding to the first media and the second media;
keeping at least one of the first multipliers, the at least one of the first multipliers corresponding to the union; and
including at least one of the first multipliers in the second equations.

25. The method of claim 19, wherein the union is a first union, the tree association corresponds to a second union of third and fourth media, the total audience corresponding to a third union of the first and second unions.

26. The method of claim 25, further including determining the estimate of the population reach of the first union based on a difference between a first percentage of the total audience and a second percentage of the total audience if the first union is removed from the tree association.

27. The method of claim 19, further including
collecting meter data and known census data via a network communication, the meter data including first data related to the total number of the panelists that accessed (a) the first media, (b) the second media, and (c) the first media or the second media, the known census data including second data related to the total audience that accessed the first media and the second media, the known census data missing unknown census data related to a second total audience for the union corresponding to the first and second media;
causing storage of the meter data and the known census data; and
accessing the meter data and the known census data to estimate the missing unknown census data, the unknown census data being the estimate for the population reach of the union.

* * * * *